US010152828B2

(12) United States Patent
McCann et al.

(10) Patent No.: US 10,152,828 B2
(45) Date of Patent: Dec. 11, 2018

(54) GENERATING SCENE RECONSTRUCTIONS FROM IMAGES

(71) Applicant: Umap AV Corp., Columbus, OH (US)

(72) Inventors: Robert M. McCann, Columbus, OH (US); Benjamin J. Vander Jagt, Columbus, OH (US)

(73) Assignee: Umap AV Corp., Columbus, OH (US)

( * ) Notice: Subject to any disclaimer, the term of this patent is extended or adjusted under 35 U.S.C. 154(b) by 25 days.

(21) Appl. No.: 15/282,733

(22) Filed: Sep. 30, 2016

(65) Prior Publication Data

US 2017/0092015 A1 Mar. 30, 2017

Related U.S. Application Data

(60) Provisional application No. 62/235,270, filed on Sep. 30, 2015.

(51) Int. Cl.
| | |
|---|---|
| *G06K 9/00* | (2006.01) |
| *G06T 19/20* | (2011.01) |
| *G06T 17/00* | (2006.01) |
| *G06T 7/30* | (2017.01) |

(52) U.S. Cl.
CPC .............. *G06T 19/20* (2013.01); *G06T 7/30* (2017.01); *G06T 17/00* (2013.01); *G06T 2207/10012* (2013.01); *G06T 2207/10021* (2013.01)

(58) Field of Classification Search
CPC ........... H04N 1/00204; H04N 1/00244; H04N 2201/0081; H04N 7/181
USPC ....... 382/154, 170, 171, 209, 282, 284, 291, 382/294; 345/419, 653
See application file for complete search history.

(56) References Cited

U.S. PATENT DOCUMENTS

| | | | |
|---|---|---|---|
| 6,711,293 B1 | 3/2004 | Lowe | |
| 7,158,689 B2 * | 1/2007 | Valleriano | G07C 1/22 382/278 |
| 7,296,428 B2 * | 11/2007 | Cleland | B67D 1/0861 62/196.1 |
| 7,343,268 B2 * | 3/2008 | Kishikawa | G06F 17/5004 345/419 |
| 7,359,526 B2 * | 4/2008 | Nister | G06K 9/209 382/100 |
| 7,564,455 B2 * | 7/2009 | Gatewood, Jr. | G06T 19/00 345/419 |
| 7,898,522 B2 * | 3/2011 | Hildreth | G06F 3/011 345/156 |
| 8,160,400 B2 | 4/2012 | Snavely et al. | |
| 8,228,327 B2 * | 7/2012 | Hendrickson | H04N 13/0022 345/420 |
| 8,488,863 B2 * | 7/2013 | Boucheron | G06K 9/0014 382/131 |
| 8,525,724 B2 * | 9/2013 | Insanic | G01S 7/003 342/26 D |

(Continued)

OTHER PUBLICATIONS

Brown and Lowe., "Unsupervised 3D object recognition and reconstruction in unordered datasets," *In International Conference on 3D Imaging and Modeling.*, 2005, 8 pages.

(Continued)

*Primary Examiner* — Yosef Kassa
(74) *Attorney, Agent, or Firm* — Fish & Richardson P.C.

(57) ABSTRACT

Computer techniques and systems for decomposing a scene into small scene partitions that can be independently solved and merged into a single cohesive scene without loss in reconstruction quality.

20 Claims, 17 Drawing Sheets

(56) References Cited

U.S. PATENT DOCUMENTS

| | | | |
|---|---|---|---|
| 8,620,095 B2 | 12/2013 | Sinha et al. | |
| 8,957,892 B2 * | 2/2015 | Neuman | G06T 15/20 345/419 |
| 9,036,700 B2 * | 5/2015 | Luthra | H04N 13/161 375/240.08 |
| 2011/0311104 A1 | 12/2011 | Sinha et al. | |

OTHER PUBLICATIONS

David G. Lowe, "Distinctive image features from scale-invariant keypoints," *International Journal of Computer Vision.*, 60(2):91-110, Jan. 5, 2004.

Snavely et al., "Photo Tourism: Exploring image collections in 3D," *ACM Transactions on Graphics (Proceedings of Siggraph 2006).*, 2006, 12 pages.

Stijn van Dongen, "Graph Clustering by Flow Simulation". PhD thesis, University of Utrecht, May 2000, 175 pages.

\* cited by examiner

GENERATING SCENE RECONSTRUCTIONS FROM IMAGES

CROSS-REFERENCE TO RELATED APPLICATIONS

This application claims priority under to U.S. Provisional Patent Application No. 62/235,270, titled "GENERATING SCENE RECONSTRUCTIONS FROM IMAGES," which was filed on Sep. 30, 2015, the entire contents of each of which are hereby incorporated herein by reference.

TECHNICAL FIELD

This document generally describes computer technology for reconstructing metric three-dimensional ("3D") scene geometries from collections of 2D images, and more particularly, to computer technology that allows for efficient large-scale metric 3D scene reconstructions, such as reconstructions performed at runtime using a large number of two-dimensional ("2D") images.

BACKGROUND

Metric 3D scene geometry reconstruction involves generating points that map out scenes in 3D space using sets of 2D images depicting the scenes from various vantage points. For example, 3D scene geometry reconstruction has been used to generate points that define buildings and other physical structures in a geographic area (example scene) using aerial photographs of the geographic area (example 2D image set), such as photographs taken by drones flying over a geographic area.

Metric 3D scene geometry reconstruction has been performed using a variety of inputs, including reference ground points, camera extrinsics, camera intrinsics, and georegistration information. "Camera extrinsics" refers the position of the camera within 3D space and the camera's orientation relative to a coordinate frame axis. "Camera intrinsics" refers to the radial distortion of the camera's lens, the focal length of camera, the principal point, and other optical factors affecting the image captured by a camera. Reference ground points are points in 3D space for features within a scene that can be correlated across multiple images and can be used to triangulate the relative pose of the cameras viewing the features. Georegistration information includes information that identifies the geographic location at which was captured, such as GPS coordinates.

Methods for reconstructing metric 3D scene geometries from collections of 2D images on small scales (e.g., small number of images included in a source image set) have used a variety of techniques, such as structure-from-motion techniques and other photogrammetric reconstruction techniques. These techniques have exhibited high-order polynomial time algorithmic growth which has made them inefficient when applied to large scale image sets (e.g., "internet-scale" image sets).

SUMMARY

This document generally describes computer technology for efficiently reconstructing metric 3D scene geometry from 2D image sets, including large scale 2D image sets (e.g., internet-scale image sets). 3D scenes can be reconstructed using image graphs, which can be formed by identifying and matching image features across a large image set. Image graphs can be annotated with available information, such as geogregistration data, camera extrinsics, camera intrinsics, reference ground points, and other available information. However, such information can be incomplete and still allow for 3D scenes to be accurately reconstructed.

Image graphs can be used to organize images and the features they depict, and can be used to partition large image sets into smaller image subsets that can processed independently to generate reconstructions of portions of the larger scene. These reconstructed portions can be merged together to generate a comprehensive scene reconstruction of the larger image set. For example, image graphs can be decomposed into a collection of disconnected components, which can be used to produce overlapping components that include subsets of graph vertices from adjacent components. These disconnected components can be independently solved in parallel, such as across a distributed computing platform (e.g., cloud-based computer system).

Additionally, such independently solved components can be combined into an approximate cohesive metric 3D scene, which can then be used to generate a more precise final metric 3D scene geometry. For example, ground points that are independently generated from a plurality of disconnected components can be merged into a cohesive scene. Ground points can be merged using various details about the underlying data that was used to generate each of the points in the disconnected components, such as using each particular image's intrinsic and extrinsic properties as an average of all of the particular image's intrinsic and extrinsic properties calculated across multiple different components.

Furthermore, errors that may exist in an approximate cohesive metric 3D scene can be reduced to produce a final (and more precise) metric 3D scene geometry of an internet-scale image set. For example, merging can incorporate each individual component in a global minimization and can be performed an iterative fashion until the solution for the scene and camera properties converges to at least a threshold level of accuracy. This can help produce metric 3D scene geometries that have high levels of accuracy and high precision mensuration. Such metric 3D scene geometries can have a variety of applications, such as allowing the scene points and camera locations to be used for subsequent product generation.

In one implementation, a system for reconstructing metric 3D scene geometry includes an image source that provides a set of images of a scene and a distributed computing platform that is programmed to generate a metric 3D scene geometry from the set of images. The distributed computing platform can include a central computing module that is programmed to coordinate generation of the metric 3D scene geometry on the distributed computing platform, and a plurality of distributed computing modules that are each programmed to process one or more of the plurality of components in parallel. The central computing module can include memory; one or more interfaces to communicate with other computing modules that are part of the distributed computing platform; a data storage device storing a first set of instructions; one or more processors that is programmed to execute the first set of instruction using the memory and the one or more interfaces. The one or more processors to perform operations including identifying a plurality of image features from the set of images; determining matches between the plurality of image features across the set of images; generating an image graph based on the set of images and the determined matches, wherein image graph comprises (i) vertices that represent images from the set of images and (ii) edges that connect the vertices and that have weights that are determined based on the matches between the plurality of image features; decomposing the image graph into a plurality of components that each include a portion of the image graph, wherein each of the plurality of components is generated to have at least a threshold level of quality and overlap with others components; transmitting at least a portion of the plurality of components to the other computing modules in the distributed computing platform; receiving a plurality of metric 3D scene geometries from the other computing modules in the distribute computing platform, the plurality of metric 3D scene geometries having been determined in parallel across the other computing modules; and merging the plurality of metric 3D scene geometries to generate a solution providing the metric 3D scene geometry for the entirety of the image set. Each of the plurality of distributed computing modules can include memory; one or more interfaces to communicate with, at least, the central computing module; a data storage device storing a second set of instructions; one or more processors that is programmed to execute the second set of instruction using the memory and the one or more interfaces. The one or more processor to perform operations including receiving one or more of the plurality of components; determining one or more metric 3D scene geometries for the one or more plurality of components, each of the one or more metric 3D scene geometries being determined individually; and transmitting the one or more metric 3D scene geometries to the central computing module.

In another implementation, a method for reconstructing metric 3D scene geometry includes identifying, by a computer system, a plurality of image features from a set of images; determining, by the computer system, matches between the plurality of image features across the set of images; generating, by the computer system, an image graph based on the set of images and the determined matches, wherein image graph includes (i) vertices that represent images from the set of images and (ii) edges that connect the vertices and that have weights that are determined based on the matches between the plurality of image features; decomposing, by the computer system, the image graph into a plurality of components that each include a portion of the image graph, wherein each of the plurality of components is generated to have at least a threshold level of quality and overlap with others components; determining, by the computer system, a plurality of metric 3D scene geometries based on individual processing of the plurality of components; merging, by the computer system, the plurality of metric 3D scene geometries to generate an approximate solution providing metric 3D scene geometry for the entirety of the internet-scale image set; and modifying, by the computer system, the approximate solution to be a final solution achieving a comprehensive metric 3D scene geometry for the entirety of the internet-scale image set.

In another implementation, a method for reconstructing metric 3D scene geometry includes identifying, by a computer system, a plurality of geographic regions that are covered by a set of images; determining, by the computer system, overlapping areas between the plurality of geographic regions; generating, by the computer system, an image graph based on the set of images and the determined overlapping areas, wherein image graph includes (i) vertices that represent images from the set of images and (ii) edges that connect the vertices and that have weights that are determined based on the overlapping areas; decomposing, by the computer system, the image graph into a plurality of components that each include a portion of the image graph, wherein each of the plurality of components is generated to have at least a threshold level of quality and overlap with others components; determining, by the computer system, a plurality of metric 3D scene geometries based on individual processing of the plurality of components; merging, by the computer system, the plurality of metric 3D scene geometries to generate an approximate solution providing metric 3D scene geometry for the entirety of the internet-scale image set; and modifying, by the computer system, the approximate solution to be a final solution achieving a comprehensive metric 3D scene geometry for the entirety of the internet-scale image set.

Certain implementations may provide one or more advantages. For example, metric 3D scenes can be generated for large scale image sets more efficiently than with conventional metric 3D scene techniques. For instance, conventional reconstruction techniques have been restricted to small, localized image sets. In contrast, large scale image sets can be efficiently processed, such as through the decomposition of large scale image sets into individual components, which can allow for distributed and individual processing.

In a further example, the accuracy with which metric 3D scenes are generated can be improved. Data from individual components can be iteratively merged until at least a threshold level of precision is obtained, which can improve the overall accuracy with which the metric 3D scene represents a real world scene.

In another example, 3D scene geometries can be reconstructed without complete georegistration information for images that are included in image sets. For instance, internet scale image sets, particularly image sets that include images captured by non-cooperative sensors, frequently lack this such georegistration data. Metric 3D data can be reconstructed from such internet scale image sets, accommodating for gaps in georegistration data across image sets.

In a further example, effective parallelization of metric 3D scene geometry reconstruction can be accomplished while still allowing for a globally minimum solution, which can allow for widespread application of metric 3D scene reconstruction to a variety of problems which may use an internet-scale solution.

The details of one or more embodiments are set forth in the accompanying drawings and the description below. Other features and advantages will be apparent from the description and drawings, and from the claims.

BRIEF DESCRIPTION OF THE DRAWINGS

FIG. 1 is a conceptual diagram of example identified key points in an image in an example image set.

FIG. 2 is a conceptual diagram of example identified key points in two images being matched to each other.

FIG. 3 is a conceptual diagram of an example image graph and images associated with two example vertices.

FIG. 4 is a conceptual diagram of an example graph component pruning process in which weak components are removed from an image graph.

FIG. 5 is a conceptual diagram of an example image graph being decomposed into disconnected components by pruning edges with low weights identified by a cluster algorithm.

FIG. 6 is a conceptual diagram of weak components within an example image graph being merged into stronger neighboring components.

FIG. 7 is a conceptual diagram of an example overlap partition being generated between two graph components.

Like reference symbols in the various drawings indicate like elements.

DETAILED DESCRIPTION

This document generally describes computer-based technology for generating 3D scene geometries from 2D image sets, such as large scale image sets. As described in greater detail below, image sets can be used to create image graphs, which can be partitioned into smaller components that can be individually processed to generate multiple component 3D geometries for a scene. Such component geometries can be merged to provide a comprehensive 3D geometry for a scene.

Figure 1:
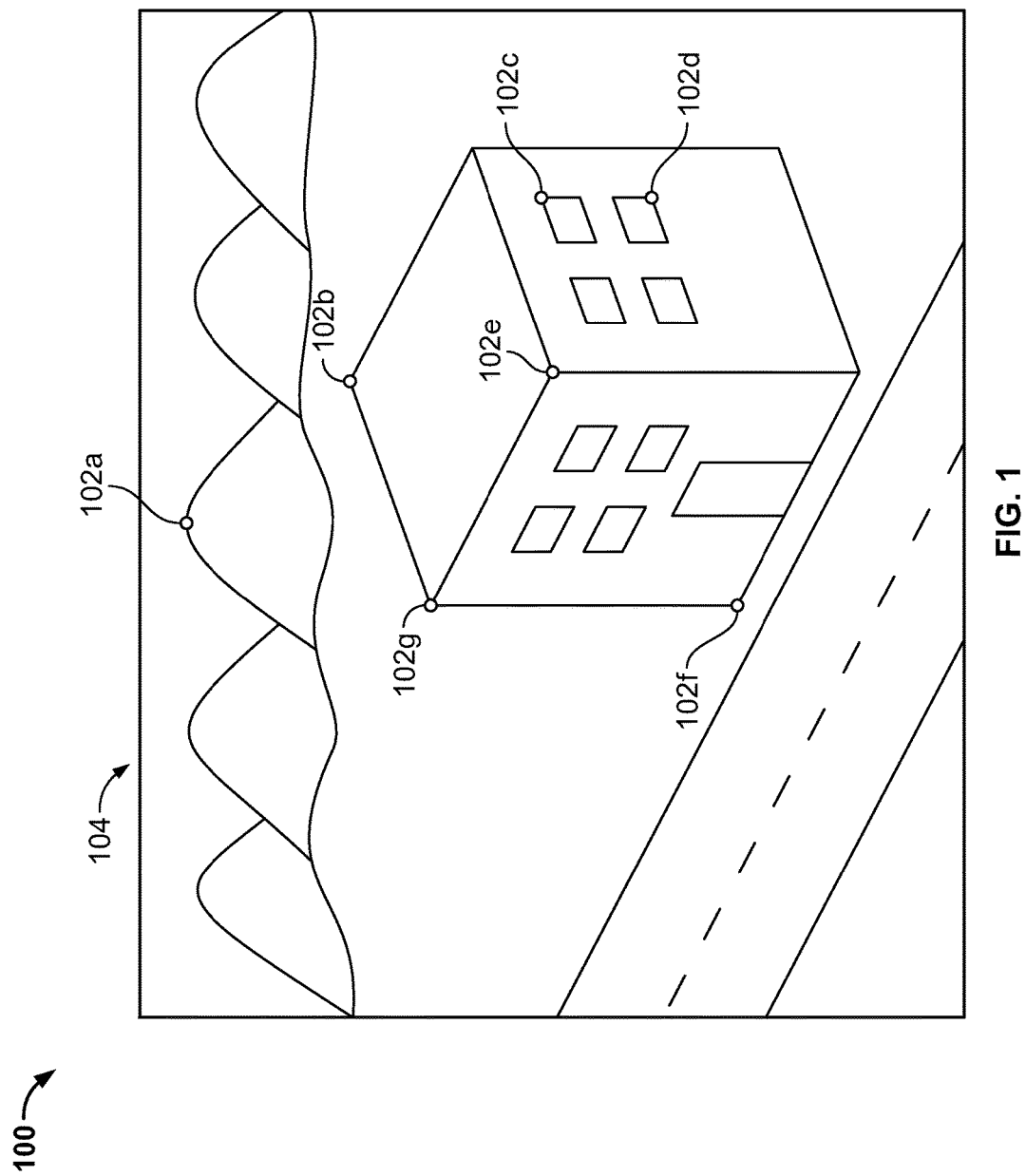
FIGS. 1-7 are conceptual diagrams 100-700 that illustrate performance of an example technique 800 depicted in FIGS. 8-9 and, in more detail, in FIGS. 10-13 for generating a 3D geometry for a scene
Figure 2:
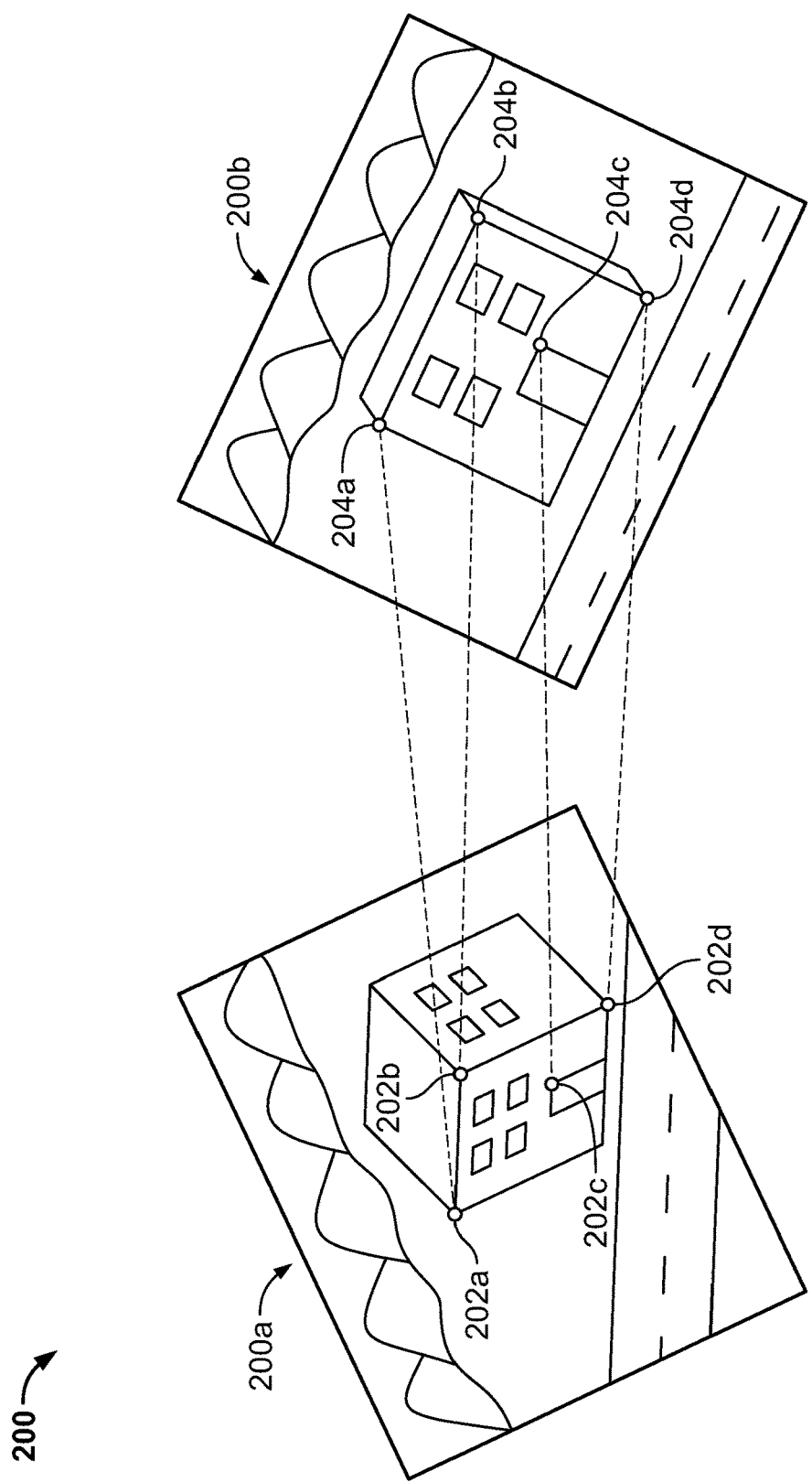
Figure 3:
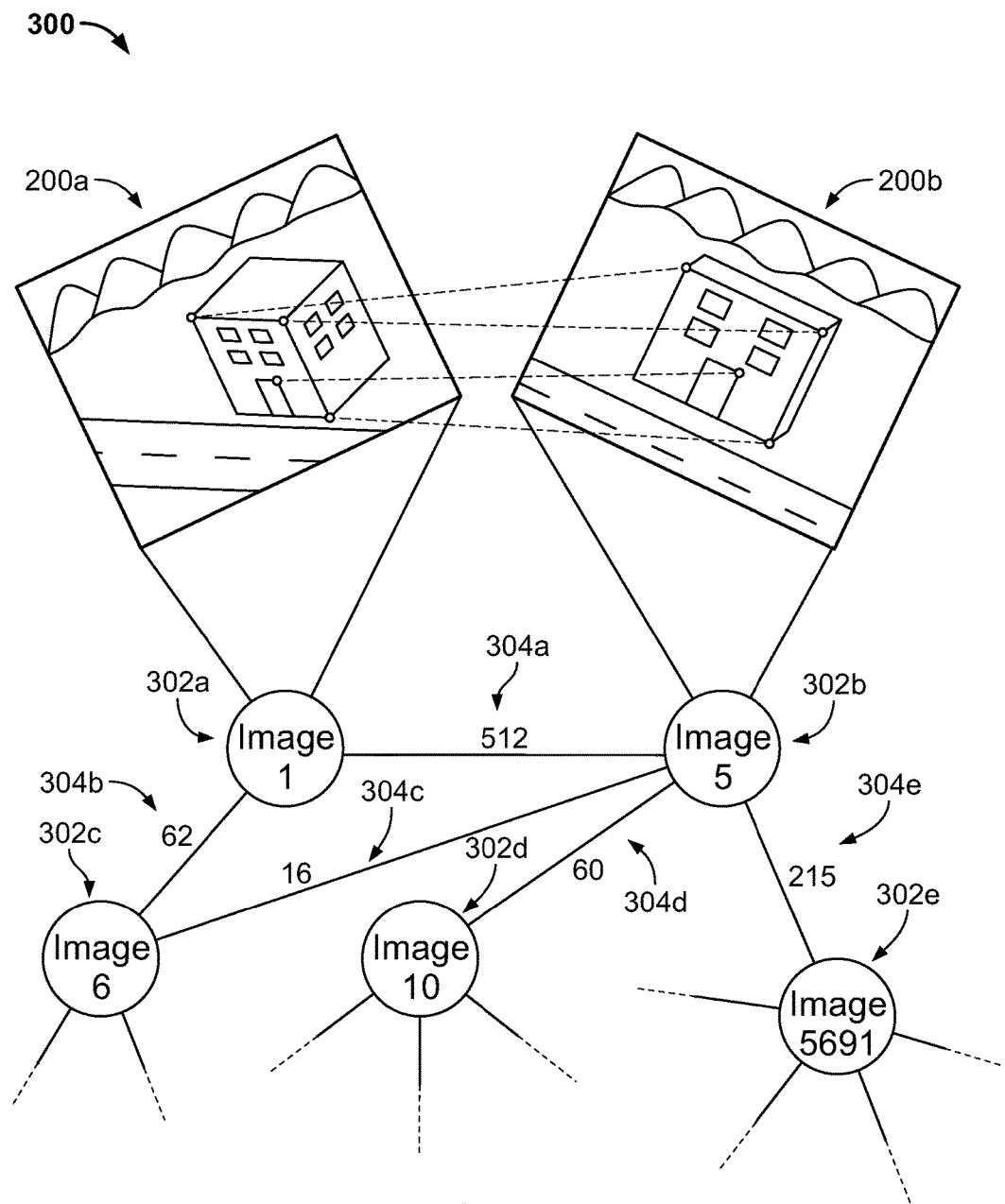
Figure 4:
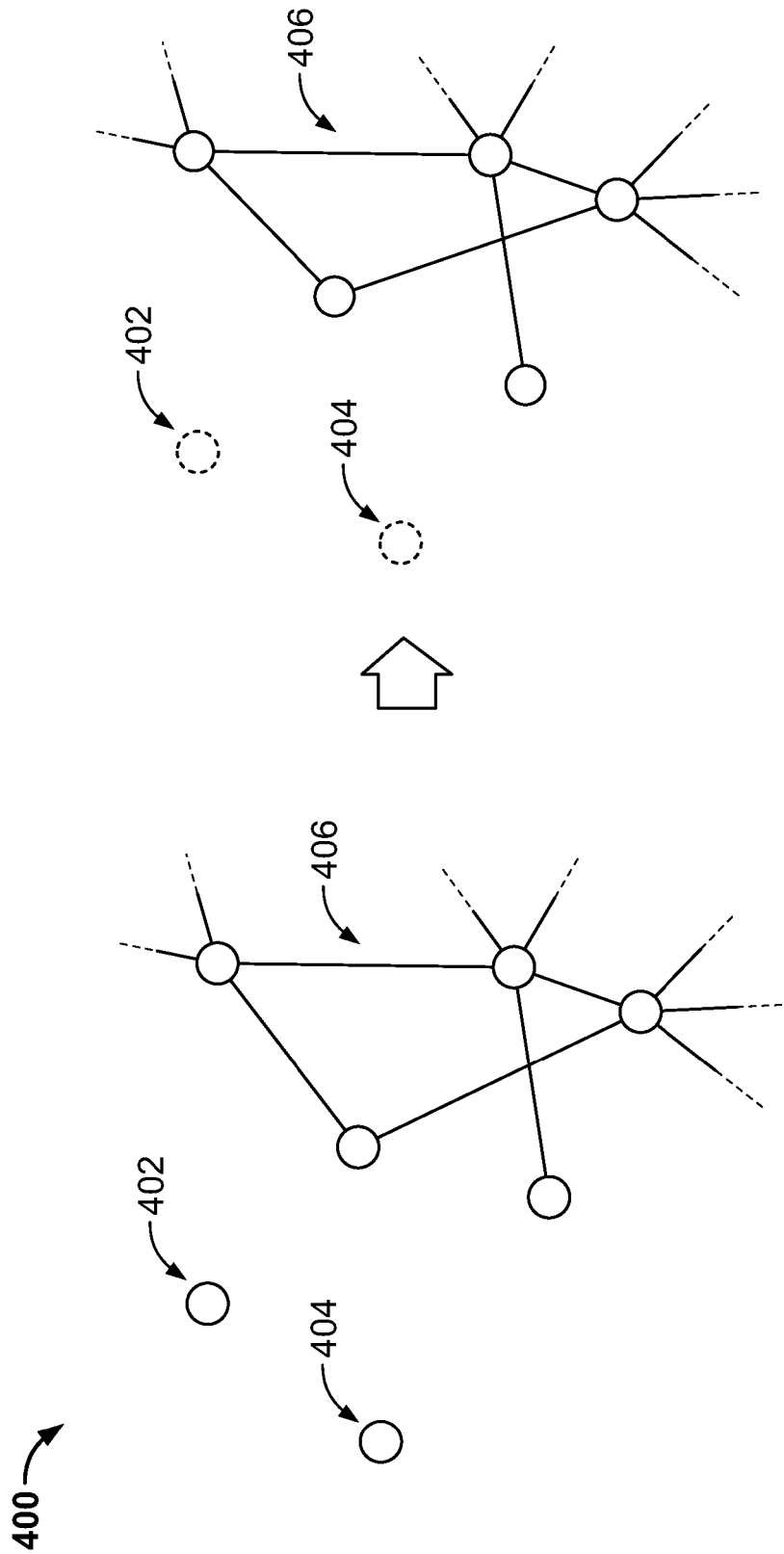
Figure 5:
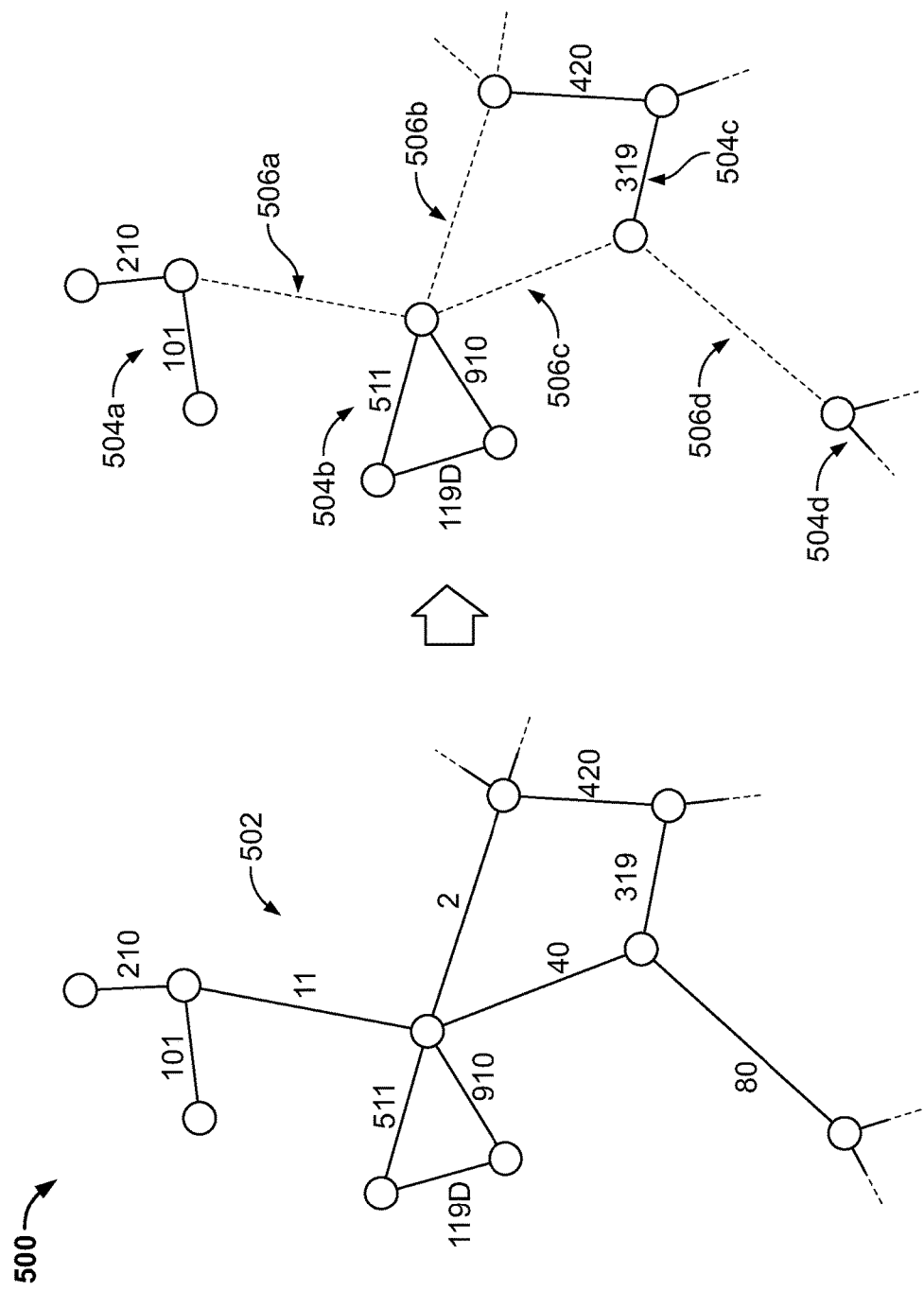
Figure 6:
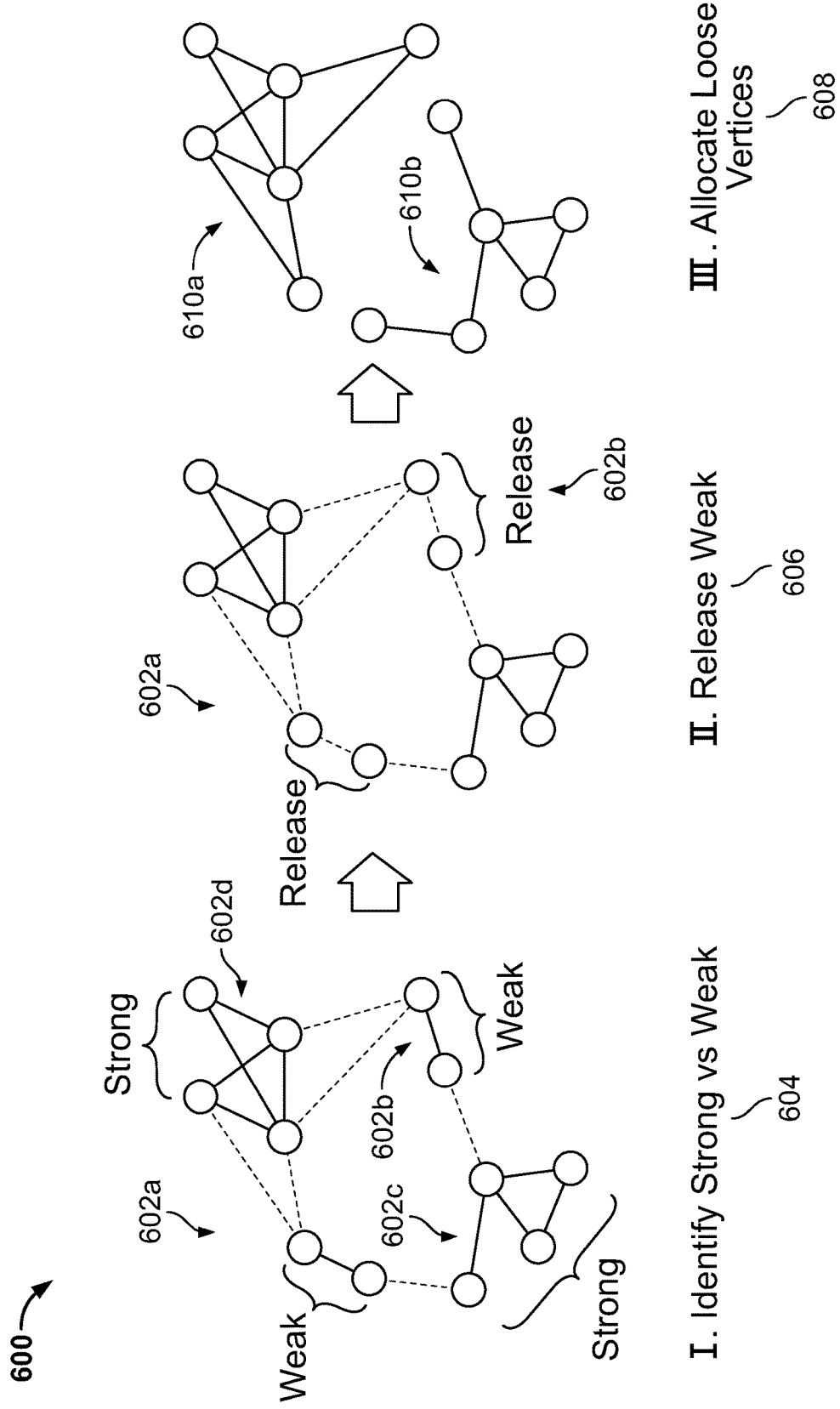
Figure 7:
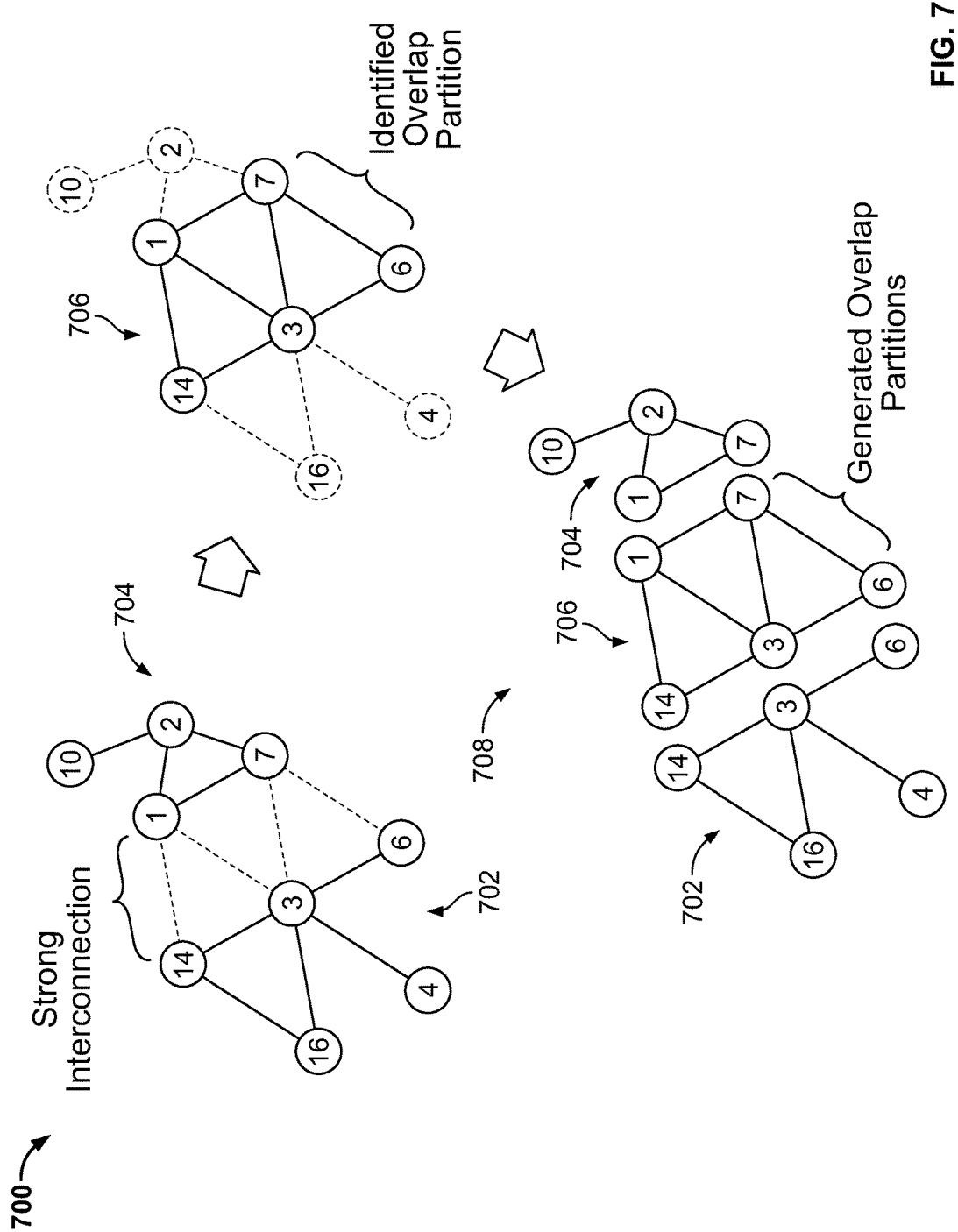
Figure 8:
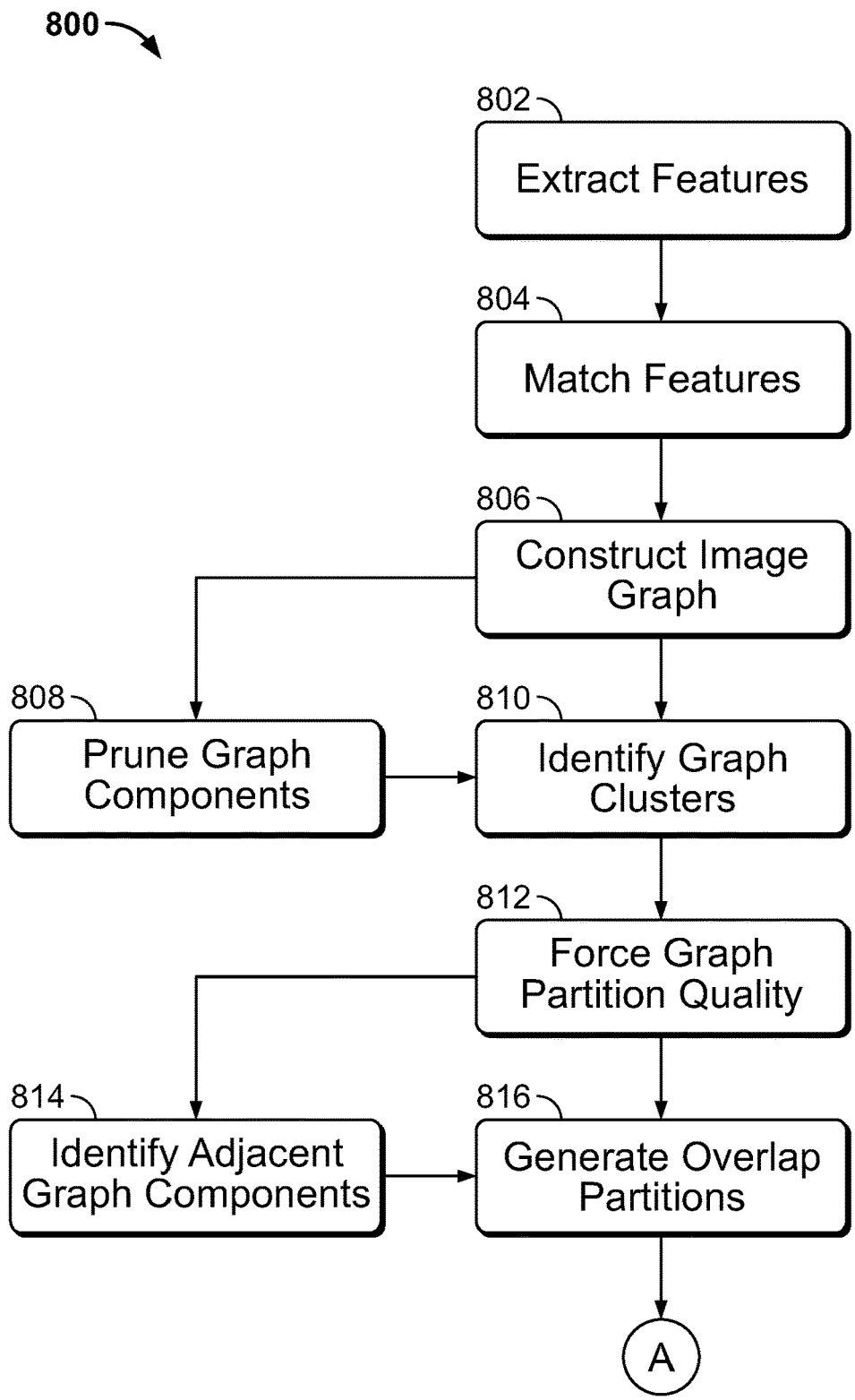
FIGS. 8-9 are flowcharts of an example technique for generating 3D scene geometries from image sets.
Figure 9:
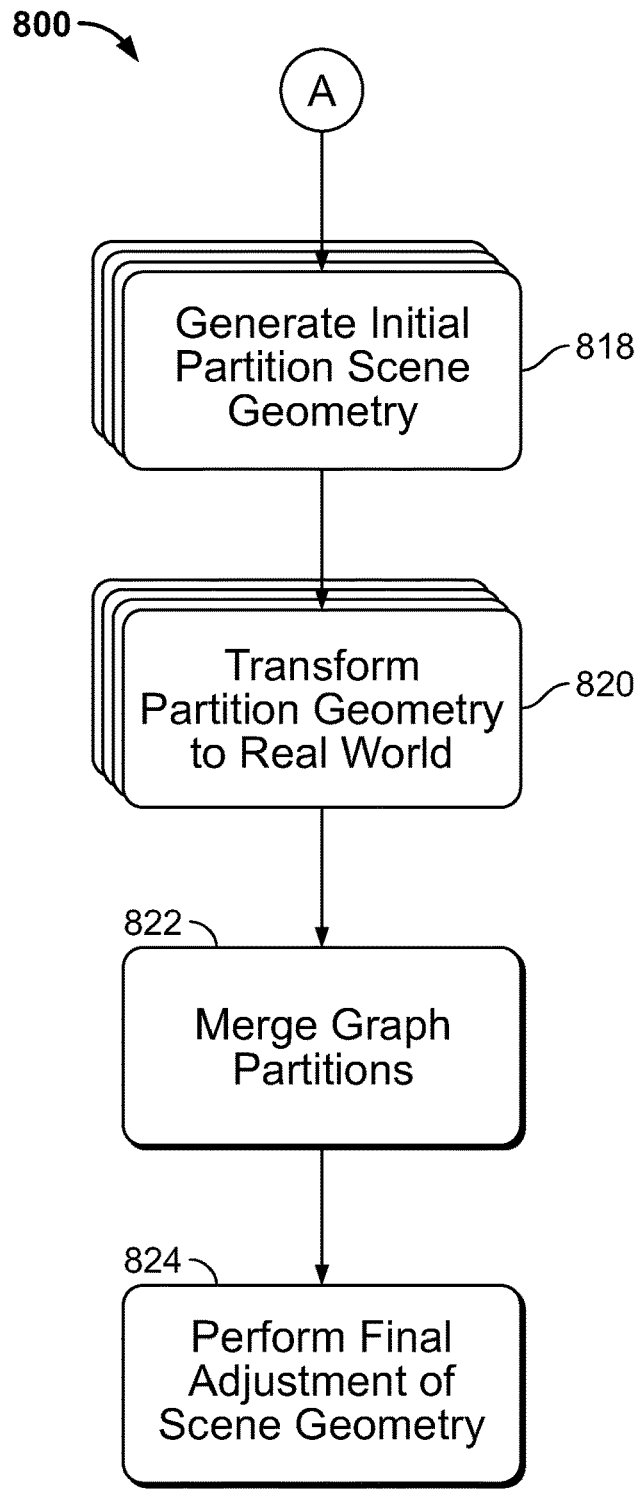
Figure 10:
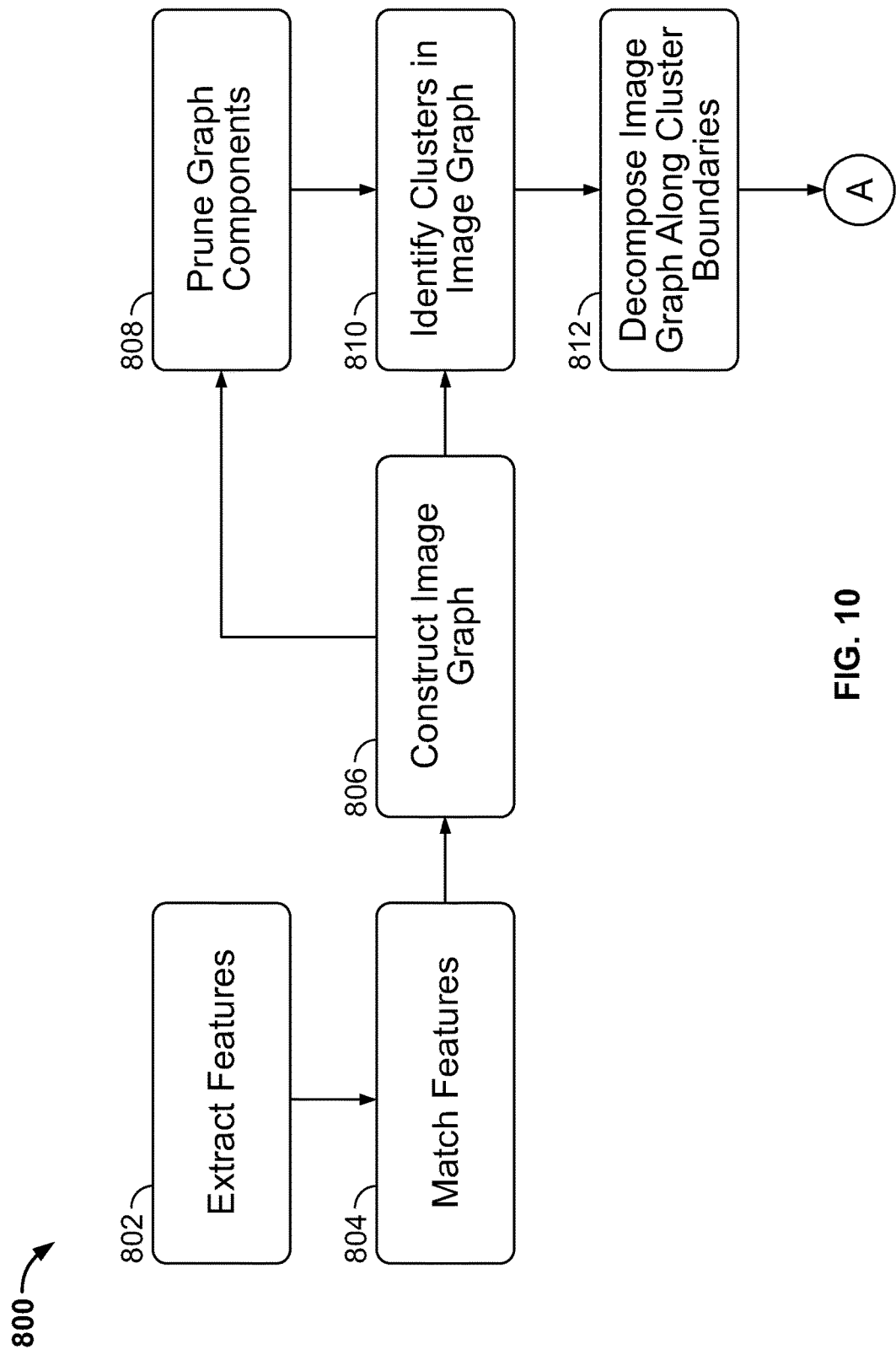
FIGS. 10-13 are flowcharts of an example technique for generating 3D scene geometries from image sets.
Figure 11:
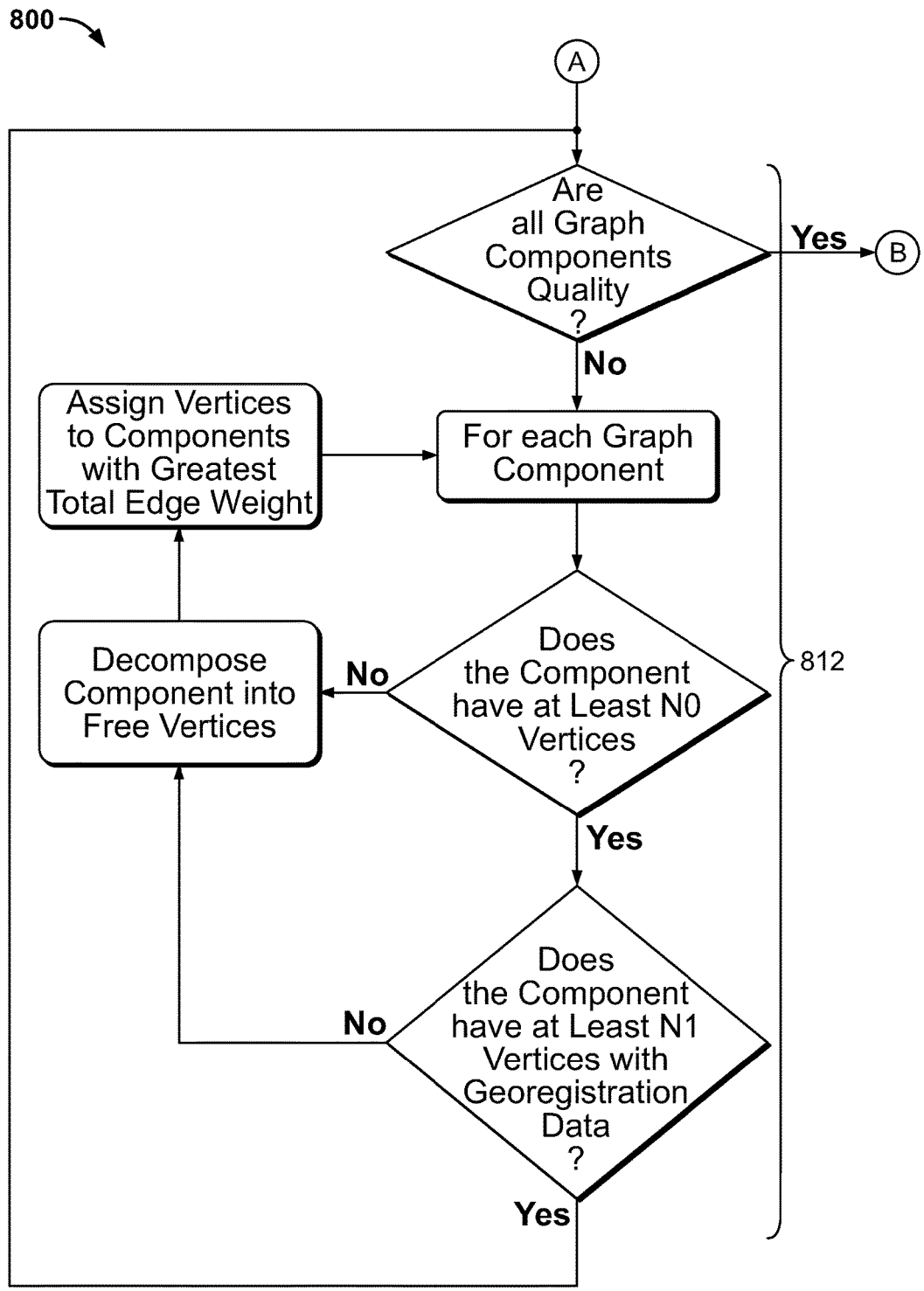
Figure 12:
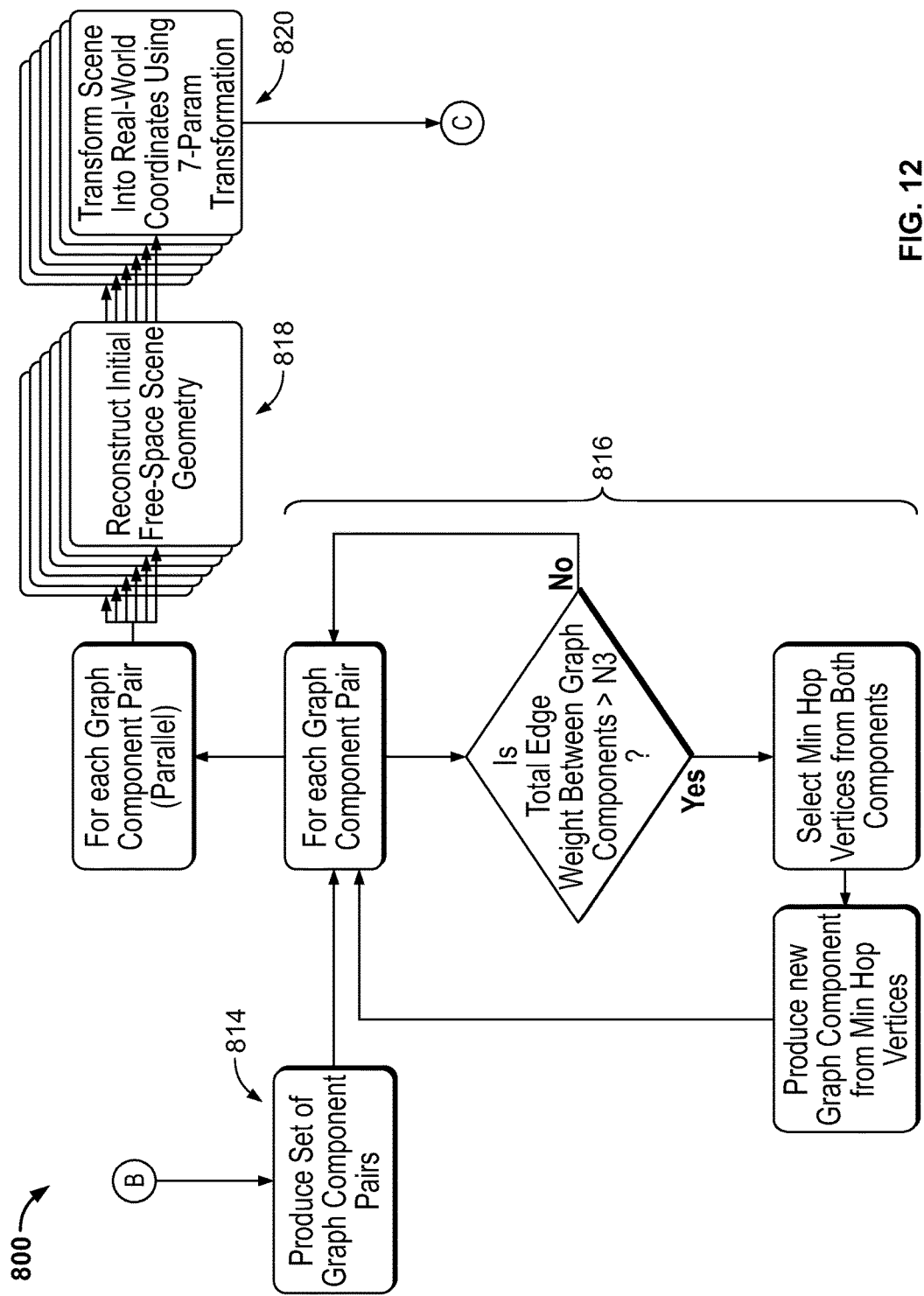
Figure 13:
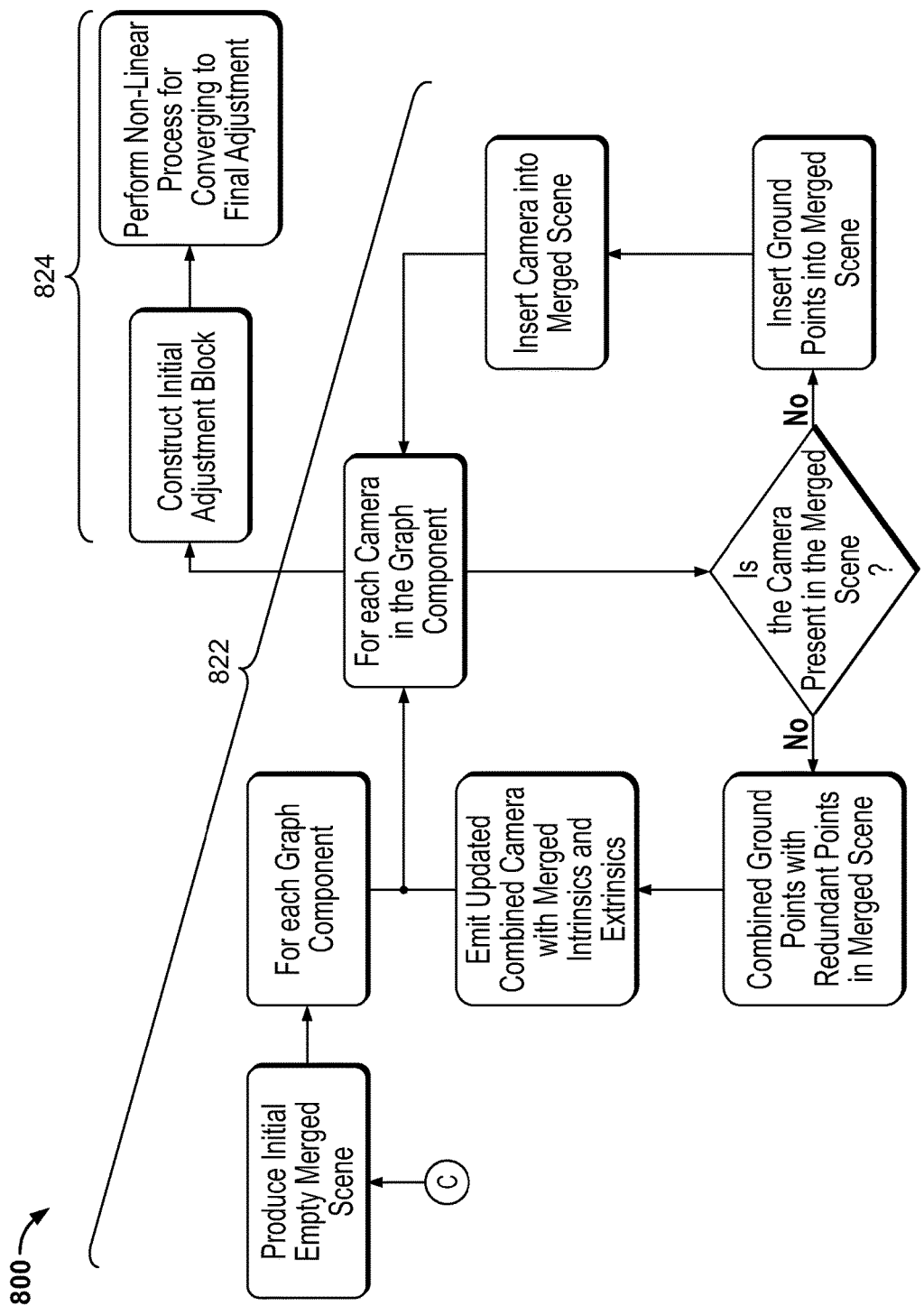
Figure 14:
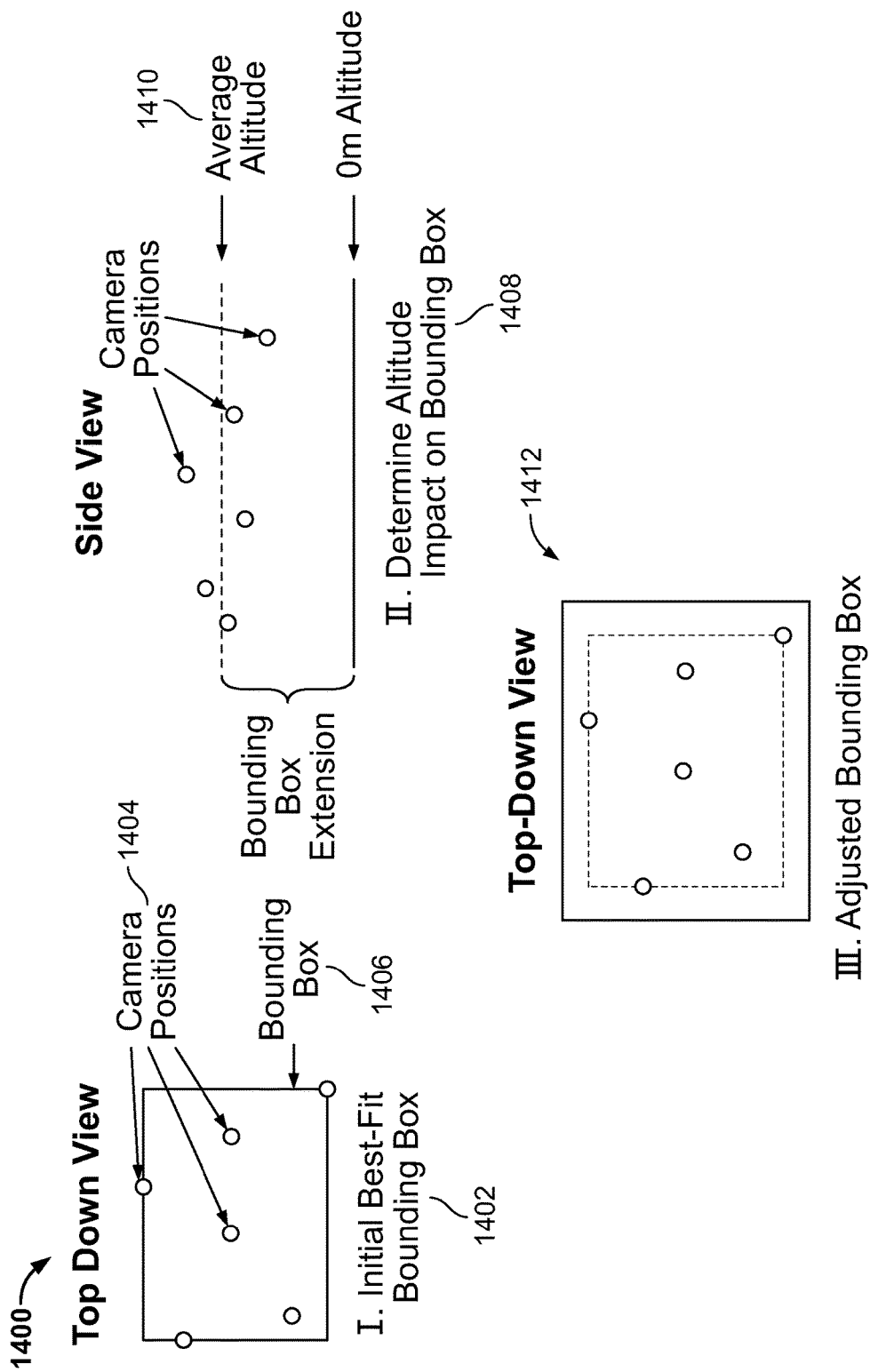
FIG. 14 is an illustration of the estimated bounding box enclosing an image set.
Figure 15:
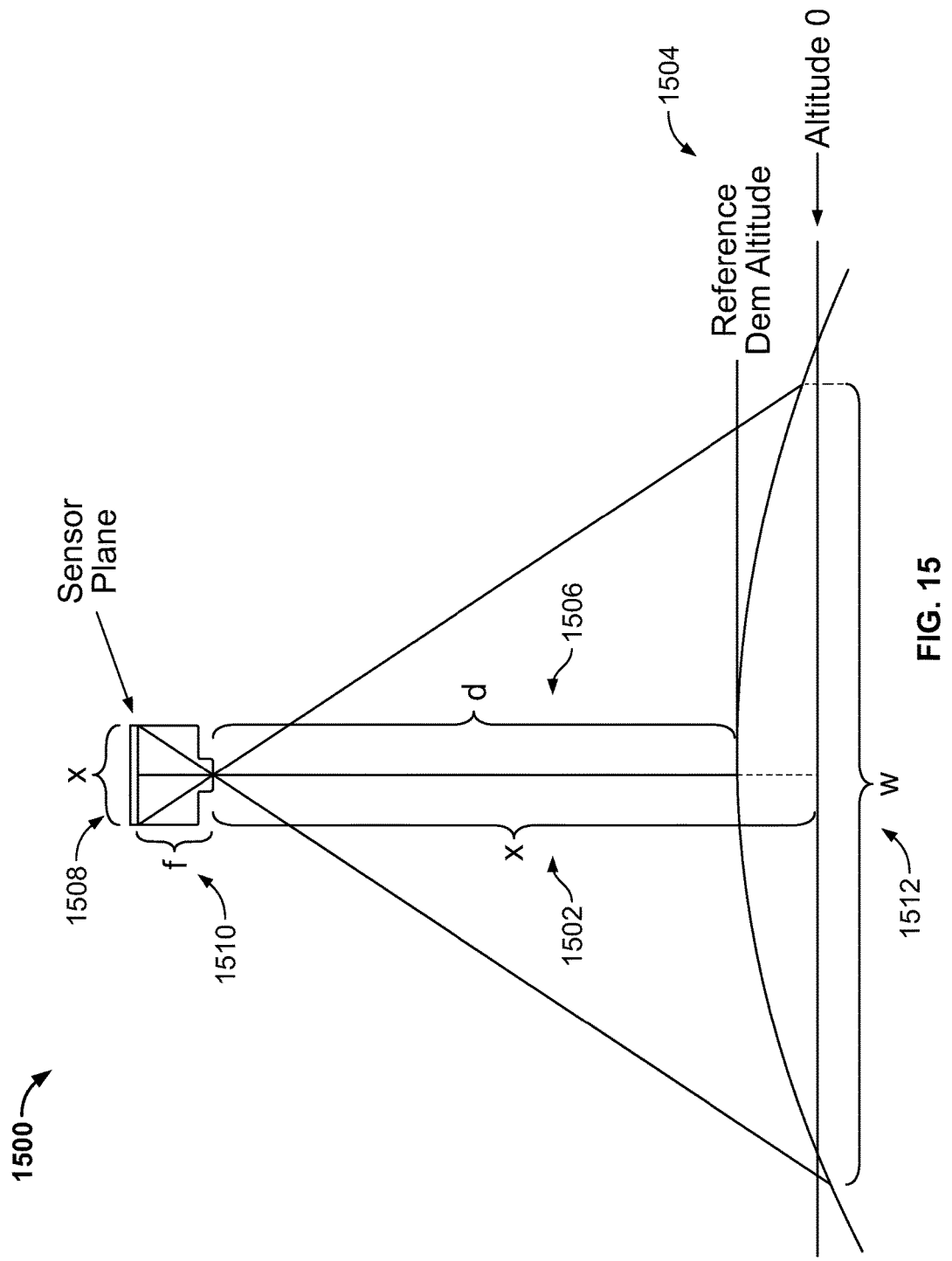
FIG. 15 is an illustration of the calculated ground coverage of an image.
Figure 16:
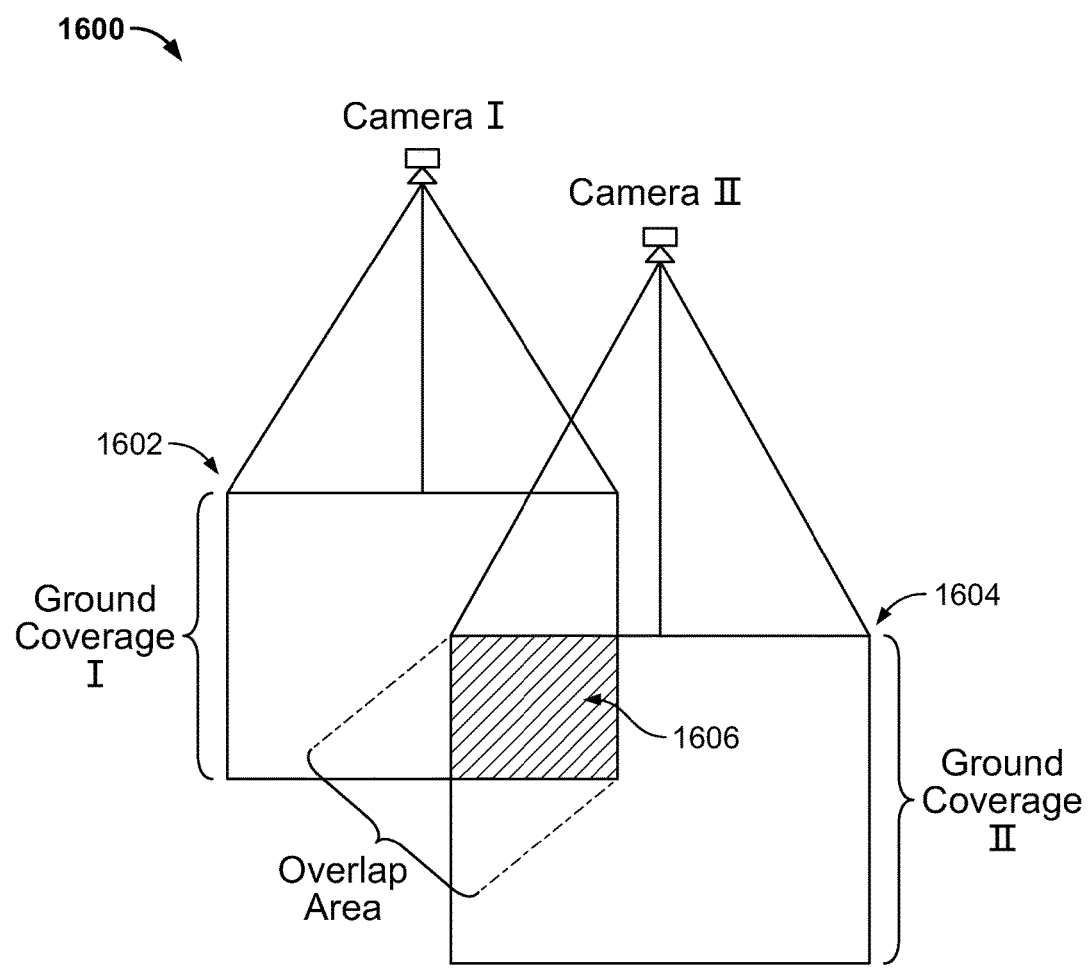
FIG. 16 is an illustration of the ground coverage overlap between two images.
Figure 17:
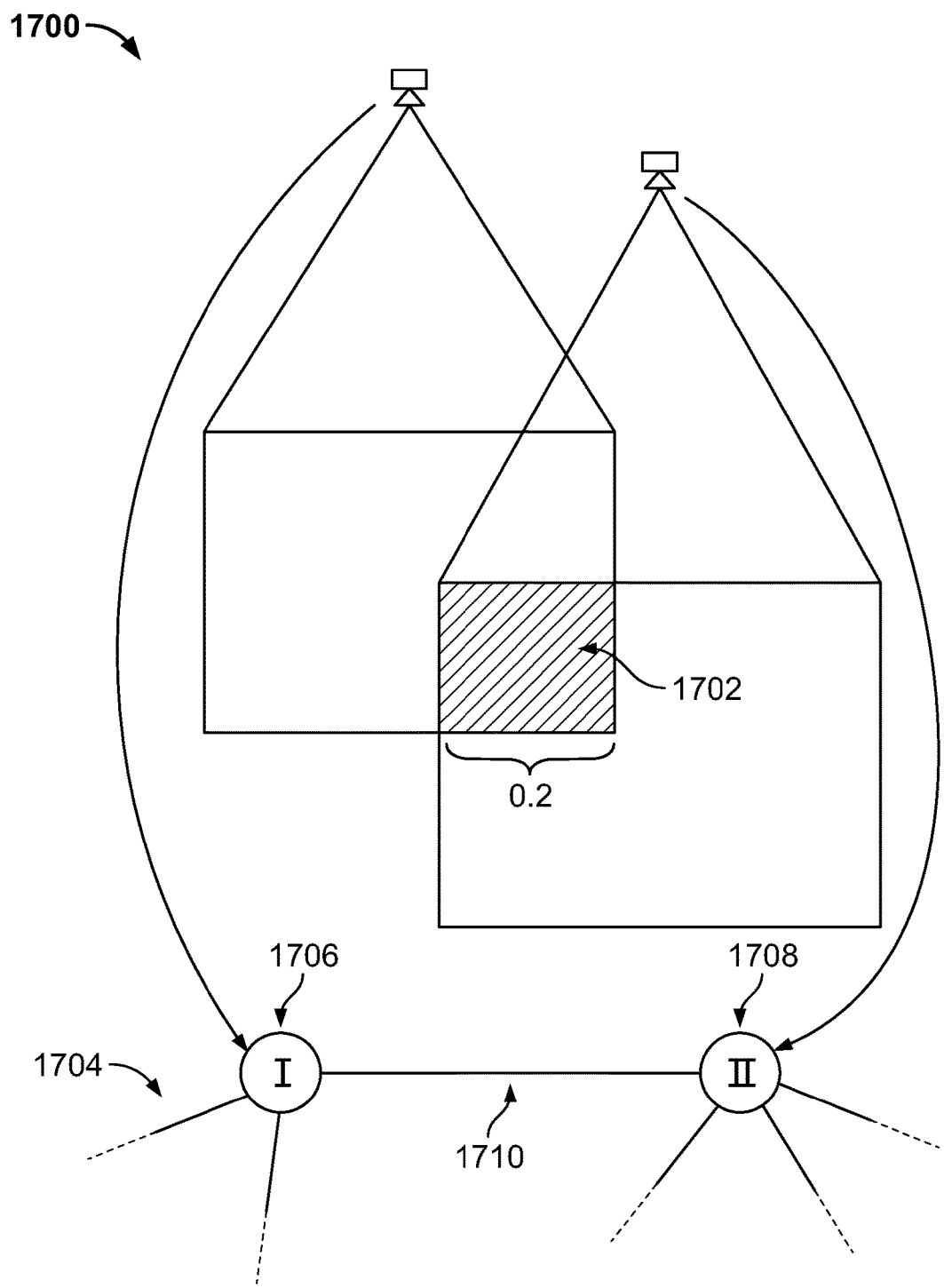
FIG. 17 is an illustration of the produced image graph and the images associated with two vertices within that graph.

FIGS. 1-7 are conceptual diagrams 100-700 that illustrate performance of an example technique 800 depicted in FIGS. 8-9 and, in more detail, in FIGS. 10-13 for generating a 3D geometry for a scene. The conceptual diagrams 100-700 are described in line with the technique 800. The example technique 800 can be performed by any of a variety of appropriate computing devices (e.g., mobile computing devices (e.g., smartphone, tablet computing device, wearable computing devices), laptop, desktop computer, servers), computer systems (e.g., cloud-based computer system), or combinations thereof. For example, a cloud-based computer system can be programmed to perform the example technique 800 across a distributed network of computing modules that can be deployed as needed to perform various operations of the technique 800. For instance, some portions of the technique 800 can be performed by a central computing module that coordinates parallel processing of components of an image graph by a distributed group of computing modules. Other systems can also be programmed to perform the technique 800.

The conceptual diagrams 100-700 illustrate the technique 800 being performed using an example image set composed of a multitude of digital images collected from an unmanned aerial vehicle flying over the city of Columbus, Ohio. In the depicted example, the image set is composed of 12,594 digital images of the buildings, streets, and other landscape features of the Grandview Heights neighborhood in Columbus, Ohio. These images cover several square kilometers of ground surface and each image has varying levels of overlap with other images in the image set. For illustrative purposes, this example image set is depicted in diagrams 100-700 as it is processed according to the example technique 800.

In the description below, the notations c0-c3 are used. In this example, c0 corresponds to a minimum set and/or number of acceptable vertices in a disconnected image graph component, c1 corresponds to a minimum set and/or number of acceptable vertices with georegistration labels in a disconnected image graph component, c2 corresponds to a minimum acceptable total edge weight between two disconnected image graph components for the components to be considered "adjacent" to each other, and c3 corresponds to a percentage of vertices composing a component $C_i(V,E)$ that are included in a produced overlap component $Co(C_i, C_j)$.

Detect Features from Images Covering a Scene (802)

For each image that depicts at least a portion of a scene, distinct features from the image are detected using any of a variety of appropriate feature detection techniques, such as a Scale Invariant Feature Transform (SIFT) feature detection algorithm. For example, diagram 100 illustrates detecting example features 102*a-g* from image 104. In this example, the detected features 102*a-g* correspond to groupings of visually distinct pixels, which can correspond to portions of a building (e.g., corners of the building, windows) and landscape features (e.g., mountains), for example. Other features can also be detected. For each image in the example image set, a corresponding feature file (or other appropriate data structure) containing a list of detected features in the image can be generated. A feature file can include, for example, a description vector describing each feature as well as an x and y coordinate position of each feature within the image.

Identify Matches between Global Set of Features Detected in Images (804)

For each set of features detected in an image, the description vectors can be compared to the description vectors of features detected in other images in an image set (e.g., large scale image set). If a feature from one image (A) is compared to a feature in another image (B) and the descriptor vectors are sufficiently similar, these features can be identified as potential matches. After the initial match candidates have been determined for each image, spurious matches can be eliminated using a geometric consistency test. For example, a geometric consistency test can include use epipolar geometry that relates the x,y coordinate location of the detected feature in image A to the x,y coordinate location of the detected feature in image B. Finding a correct epipolar geometry between two image features can be a model-fitting problem with noisy data, which can be solved using any of a variety of appropriate techniques, such as RANSAC (or RANdom SAmple Consensus). Other geometric consistency tests are also possible.

For example, the diagram 200 illustrates feature matches being identified between features 202*a-d* in image 200*a* and features 204*a-d* in image 200*b*. The features of an image set can be searched in this manner and matching features across the images can be identified. A file (or other appropriate data structure) containing one or more lists of feature matches across a set of images can be generated. Incorrect matches can be removed, for example, using a model fitting algorithm.

Construct an Image Graph Composed of Image Vertices and Match Weight Edges (806)

An image graph representing the images in a scene and their relationships to each other can be constructed. The image graph can be defined, for example, as the undirected graph G(v, e) where v-i is a vertex labeled as image-i, and optionally also labeled with georegistration-i if available, and e-ij is an edge defined as connecting vertices v-i and v-j, where e-ij's weight indicates a relationship between the vertices v-i and v-j. The weight of an edge can indicate a degree to which two images include common features and can be determined in any of a variety of ways. For example, the weight can be determined as the sum of all matched features between two images, where feature-i is in the set of features-i and feature-j is in the set of features-j.

In the graph depicted in diagram 300, each of the images in the example image set are represented as vertices 302a-e (as well as other vertices not depicted) and the matches between the images is represented as edges 304a-e (as well as other edges not depicted) between those vertices with edge weights determined based on, for example, a number of feature matches between the images. For instance, the example images 200a and 200b are represented by vertices 302a and 302b, respectively, and have a weight on edge 304a that is determined based on common features between the images 200a and 200b.

Prune Graph Components too Small for Reconstruction (808)

Identify disconnected graph components using, for example, a breadth-first graph traversal technique and/or other appropriate graph analysis techniques. For each graph component C(v, e) in G(v,e), if |C(v)|<c0, then that component and its subparts (vertices, edges, associated images) are removed from further consideration. Components that are removed are determined to lack sufficient connectedness to other images to allow for successful reconstruction of metric 3D scene geometry.

For example, the diagram 400 depicts the image graph representing the example image set having been separated into its separate connected components. In this example, images corresponding to vertices 402 and 404 are not connected to other images in the graph 406, which may occur under a variety of scenarios. For example, if an unmanned aerial vehicle is hit with a hard gust of wind and has to bank into the wind, the images it produces may be of the horizon instead of the ground below. Vertices 402 and 404 representing these disconnected images can be identified and removed from the graph 406, as indicated by the vertices 402 and 404 having dashed lines in the graph on the right.

Decompose Graph into Disconnected Components by Detecting Graph Clusters (810)

The image graph can be decomposed into disconnected components, with the aim being to generate sets of disconnected components that maximize the total number of edges between v0, v1 for all v in C(v, e). This can be accomplished by identifying clusters of tightly connected vertices within a graph. These clusters can be identified using any of a variety of appropriate techniques, such as a Markov Cluster Algorithm and/or other sufficiently robust graph clustering algorithms. After identification of clusters C(v,e) composing G(v, e), edges linking C0(v,e) to any C1(v,e) are removed to produce a modified G(v,e) composed of C(v,e) disconnected components.

For example, as depicted in the diagram 500, before this step the image graph consists of a one or more very large connected components, as represented by graph 502. These components may be too large to be efficiently processed as a whole, and may instead be broken down into smaller components for individual processing. This step decomposes the image graph from several very large components into many small components 504a-d. Edges 506a-d linking the components 504a-d can be removed.

Enforce at Least a Threshold Level of Quality on Each of the Graph Components (812)

Decomposing the image graph into cluster-based disconnected components can produce some components that may not be ideal candidates for metric 3D scene geometry reconstruction. Good candidates for metric 3D scene geometry reconstruction can include any of a variety of appropriate properties, such as:

Property 1: |v| in C(v,e)>c0
Property 2: 1. |v-g| in C(v,e)>c1 where v-g is defined as vertices with geotag labels Such properties can be evaluated in any of a variety of ways. For instance, the pseudo-code below outlines an example technique that can be used to generate graph components with at least a threshold level of quality, which can include breaking some components apart, reforming components, and leaving some components unmodified.

While t.e. C(v,e) in G(v,e) s.t. C(v,e) does not satisfy Property 1 and Property 2:
  For each C0(v,e) in G(v,e):
    If C0(v,e) does not satisfy Property 1 or does not satisfy Property 2:
      Decompose C0(v,e) into the set S(v)
      For each v-s in S(v):
        Let connectivity be defined as the sum of edge weights connecting v-s to a component C(v,e)
        Let the initial best connectivity value be set to 0
        For each C(v,e) in G(v,e) where C(v,e) is not C0(v,e):
          Determine the connectivity between v-s and C(v,e)
          If the connectivity is greater than the current best connectivity, set the current best connectivity value to equal the connectivity between v-s and C(v,e) and record the C(v,e) is the currently best connected component
        Add v-s to the set of vertices comprising the best connected component C(v,e)

Other techniques to evaluate component quality and to generate components that have at least a threshold level of quality can also be used.

For instance, referring to diagram 600, an example image graph includes a number of small components 602a-d, some of which are strong (602c-d, high level of quality) and some of which are weak (602a-b, low level of quality). High quality components can be those with a greater number of vertices with interconnected edges having at least a threshold weight—indicating that the images corresponding to the vertices in the component depict the same features from different vantage points. In contrast, low quality components can be those with a lower number of vertices and fewer interconnected edges—indicating that there are not many images in the component that capture the same features. As indicated by the steps depicted in the diagram 600, a first step 604 is performed to evaluate each component in the example image set and to identify weak/low quality components (602a-b) for reconstruction. At a second step 606, the good components (602c-d) are kept in the image graph and the bad components (602a-b) are released. At a third step 608, the released vertices are added to good components in the image graph to generate new components 610a-b. Released vertices can be added to components that they are most closely related to, which can be determined based on edge weights between the released vertices and the vertices in the good components.

Identify Adjacent Graph Components (814)

To produce an accurate and tightly constrained metric 3D reconstruction, it can be beneficial to generate and use a final composed image graph, Gf(V,E), with sufficient redundancy (overlap) in connectivity between the components comprising Gf(V,E). Towards that end, so called "overlap" components can be generated from adjacent components, which can be identified in any of a variety of ways.

For example, adjacent components can be defined as any Ci(Vi,E), Cj(Vj,E) in G(V,E) s.t. the sum of edge weights connecting any Vi, Vj is greater than c2. In example technique, for each pair Ci(V,E), Cj(V,E) in G(V,E), add the pair Ci(V,E), Cj(V,E) to the list of identified adjacent graph, L(C,C) components if Ci(V,E) and Cj(V,E) satisfy the property of adjacency.

For instance, referencing the example components 610a-b, each of these components is completed disconnected from the other components. The disconnected components could be reconstructed into 3D metric data, but the relative 3D position of each component would be poorly constrained by their lack of interconnectedness. This step 814 considers each pair of components and decides if the images they represent are adjacent and thus viewing the same objects. Adjacent components are noted and saved for the next step.

Generate Overlap Graph Components from Pairs of Adjacent Graph Components (816)

Each identified pair of adjacent components can be used to generate an overlap component Co(V,E) which will be added to G(V,E). An example technique for generating overlap components is described in the pseudo-code below.

For each Ci(Vi,E), Cj(Vj,E) in L(C,C):
Let S{V} be the set of vertices to be included in the generated overlap component Co(V,E).
For each v-s in Vi:
  Let the best hop distance be initially defined to infinity
  For each v-c in Vj:
    Calculate the minimum hop distance to traverse from v-s to v-c using breadth first search or any other sufficiently robust graph traversal technique
    If the minimum hop distance is less than the current best hop distance, set best hop distance equal to the minimum hop distance
Add the c3% of v-s in Vi whose best hop distances are in the c3% least best hop distances in Vi to S{V}.
For each v-s in Vj:
Let the best hop distance be initial defined to infinity
For each v-c in Vi:
  Calculate the minimum hop distance to traverse from v-s to v-c using breadth first search or any other sufficiently robust graph traversal technique
  If the minimum hop distance is less than the current best hop distance, set best hop distance equal to the minimum hop distance
Add the c3% of v-s in Vj whose best hop distances are in the c3% least best hop distances in Vj to S{V}.
Create an overlap component Co(V,E) composed of the vertices in S{V} and all edges connecting those vertices in S{V} as present in the graph G0(V,E).
Add Co(V,E) to G(V,E).

For example, referring to the diagram 700, pairs of components 702 and 704 that are determined to be adjacent in the previous step (814) are used to produce overlap components. A portion of the vertices from each of the source components 702 and 704 are used to produce the overlap component which is composed of those vertices.

For example, the example vertices 3, 6, and 14 from component 702 and the example vertices 1 and 7 from component 704 are identified as an overlap partition 706, which is the added to the graph of components 708 which will be used to generate a 3D reconstruction. The resulting graph of components 708 includes the source components 702 and 704, and the overlap partition 706, and is composed of high quality components that are tightly interconnected with each other.

Independently Reconstruct 3D Scene Geometry for each Graph Component (818)

For each C(V,E) in G(V,E), reconstruct a free-space 3D scene geometry using the images labeled for each vertex in C(V,E). This reconstruction can be performed using any of a variety of appropriate techniques, such as structure-from-motion and/or any other sufficiently robust 3D reconstruction technique.

For instance, referring to the diagram 700, example components 702-706 of the image graph 708 representing the example image set can now be used to setup the 3D reconstruction process. Each component 702-706 is independently reconstructed which produces free space 3D data. "Free space" can indicate a 3D Euclidean coordinate system, up to scale. For example, a component composed of images viewing a building can be reconstructed into free space 3D data resulting 3D scene geometry of the building and the area around that has a very high relative accuracy, but the reconstructed scene points may not be suitable for precise measurement because they do not correspond to metric distances.

Independently Transform 3D Scene Geometry of each Graph Component into Real-World Coordinate System using Georegistration Data (820)

Because each graph component is reconstructed using relative 3D coordinate frames which are known up to scale, a transformation can be applied in order to register the graph components in an absolute 3D coordinate frame. This can be performed using any of a variety of appropriate transformation techniques, such as a Procrustes transformation involving translation, rotation, and scaling. Each graph component may need to have a number of georegistered images that is greater than or equal to c1, which can be fewer than all of the images in each graph component.

For example, each of independent free-space 3D geometry that is generated in step 818 can be transformed into a real-world coordinate system, which can result in each component having a position relative to an absolute/global coordinate frame, but not relative to each other. For instance, using the previous example component that is composed of images viewing a building on the ground below, the 3D scene geometry of this component that is generated can include appropriate positions in the world with accuracy comparable to the accuracy of georegistration data used to transform the scene. In such a sample image set, there may be another component that is also viewing the same building on the ground. Similarly, this other component's 3D scene geometry is also transformed into the world coordinate system, but because it is not transformed relative to the first component, it can have georegistration errors that are independent of the first component even though some of the images in the first component may also be in the second component. This can result in small alignment errors where the wall of the building as reconstructed in the first component is several centimeters away from the Same Wall Reconstructed in the second component.

Merge Metric 3D Scene Geometry of Disconnected Components into an Approximation of Complete Metric 3D Scene Geometry (822)

Metric 3D scene geometries of disconnected components can be merged into a single approximation of the metric 3D scene geometry representing the entirety of the original source image set. An example technique for merging 3D scene geometries of disconnected components is detailed in the pseudo-code below.

Let S{i} be the set of all source images represented in the final 3D scene geometry. Clarification: Please note that S{i} is a set, and not a multiset, meaning that images present in multiple components will only exist in the set S{i} once.

Let S{g} be the set of all ground points reconstructed in the final 3D scene geometry.

For each disconnected component C(V,E) in G(V,E), add the image labels for all v in C(V,E) to the set S{i}.

For each disconnected component C(V,E) in G(V,E):

For each vertex v in C(V,E), average the intrinsics and extrinsic properties of the labeled image for v into the corresponding image I present in S{i}.

For each disconnected component C(V,E) in G(V,E):

For each ground point in the metric 3D scene geometry of C(V,E):

Update the viewing cameras the ground point to refer to the images added to S{g}

Add the ground point to S{g}

For each ground point g in S{g}:

If the number of cameras viewing g is less than 3, remove g from S{g}

Produce an approximation of the metric 3D scene geometry representing the entirety of the original source image set composed of S{I} and S{g}.

For example, the 3D scene geometry of each of the components can be composed of ground points and source cameras. Many of the source cameras can be present in multiple components, but they may not be currently linked to each other. For instance, referencing the example components discussed in the previous steps, these components are viewing the same building and feature several images that exist in both components. The cameras representing the duplicate images present in both components can be merged into one camera, which can result in one component that includes the cameras and ground points of both components. This merging process can be repeated until all of the individual scene geometries are merged into one very large scene geometry. Even though the components have all been merged into one large scene geometry, the walls of the example building may still be misaligned.

Perform Post-Adjustment of Approximate Metric 3D Scene Geometry to Produce Final Scene Geometry (824)

Post-adjustments can be performed using any of a variety of appropriate global reconstruction techniques, such a bundle block adjustment algorithm, to align all cameras in S{i} with respect to all points in S{g}. For example, a bundle block adjustment can incorporate the stochastic properties of the cameras and scene points into the overall solution architecture. Such a process can be referred to as weighted bundle block adjustment.

For example, a final adjustment of the entire image set can be performed. This process iteratively adjusts the positions of the cameras and the ground points. The misaligned wall segments described in previous steps can be iteratively moved closer and closer until they are aligned and the final 3D scene geometry is produced.

FIGS. 14-17 are conceptual diagrams 1400-1700 depicting performance of an example technique (identified by steps A-O below) for generating graph components with at least a threshold level of quality. This example technique is described in the paragraphs below, and can be performed as an alternative to and/or in addition to the steps 802-806 (in whole or in part) described above with regard to the example technique 800.

For example, instead of using a decomposition strategy that leverages the underlying image graph structure, as described with regard to the technique 800, the example technique depicted in FIGS. 14-17 can leverage existing global digital elevation models, such as those produced from satellite data, to determine the ground surface covered by each image. The quality of connectedness between the images can be determined by evaluating the overlap in ground surface coverage. This example technique can have computational speed improvements on account of the global matching process described in step 804 being removed. However, such a speed improvement may come at the price of mildly reduced reconstruction stability and may make the technique more dependent upon the availability of georegistration data.

The examples depicted and described with regard to FIGS. 14-17 use the same example image set of Columbus, Ohio, that is described above with regard to FIGS. 1-7.

Detect Features in all Images Included in Scene (Step A)

Features can be detected in a manner similar to step 802, described above.

Determine an Estimated Bounding Box Enclosing the Entirety of Image Ground Coverage (Step B)

A subsection of an existing reference low-resolution digital elevation model, such as those produced from satellite data, can be used to determine the distance between the optical point of origin and the ground surface being captured by the image set. This subsection can be determined by computing a two dimensional bounding box which approximately encloses the entirety of the ground surface captured by the image set. An example technique for making this determination is detailed in the below pseudo-code.

Let x-min be positive infinity
Let x-max be negative infinity
Let y-min be positive infinity
Let y-max be negative infinity
For each image in the image set:
Let X, Y be the georegistration position of the image
If X>x-max, let x-max=X
If X<x-min, let x-min=X
If Y>y-max, let y-max=Y
If Y<y-min, let y-min=Y The bounding box described by the coordinate pairs (x-min, y-min), (x-min, y-max), (x-max, y-min), (x-max, y-max) is an approximate value that does not account for the altitude of the camera at the moment of image capture. The altitude can be addressed approximately by adding the average camera altitude to the bounding box coordinate pairs as follows:

Let x-min=x-min−average camera altitude
Let y-min=y-min−average camera altitude
Let x-max=x-max+average camera altitude
Let y-max=y-max+average camera altitude The bounding box enclosing the entirety of the image ground coverage can now be sufficiently addressed by the bounding box described by the coordinate pairs (x-min, y-min), (x-min, y-max), (x-max, y-min), (x-max, y-max).

For example, referring to the conceptual diagram 1400, a first step (1402) includes the GPS positions 1404 of each of the images in the example image set are used to approximate a rectangular bounding box 1406 that encloses the entire neighborhood of Grandview, the area being viewed by the image set. In a second step (1408), the addition of the average camera altitude 1410 to the bounding box coordinates results in a wider bounding box 1412 that includes an extra city block of each adjacent neighbor. This extra, unimaged space inside the bounding is not an issue. The bounding box can be used as a way to retrieve the subsection of a digital elevation model used in later calculations, and this process can have minimal computational cost.

Extract a Subsection of the Reference Digital Elevation Model (Step C)

A reference digital elevation model can be used for the steps that follow. A subsection of the digital elevation model can be extracted as direct use of the entire model may negatively impact computational performance of the steps that follow. The ground points in the digital elevation model that fall within the bounding box can be extracted and saved for use in the following steps.

For example, a digital elevation model produced by a commercial satellite can be selected as the reference for the reconstruction of the example image set. The ground points inside the bounding box calculated in the step B can be extracted for later use, which can result in a low resolution digital elevation model that covers the city of Grandview as well as extra city blocks around the edge of the sample area.

Determine the Ground Coverage Area of Each Image (Step D)

For each image in an image set, the ground coverage of that image can be determined. This calculation can be based on an understanding of intrinsic optical properties of the camera that captured each image. In practice, these properties can be stored as metadata in each image and is thus readily accessible. An example technique for determining ground coverage is detailed in the pseudo-code below.

For each image I in the set of image S:
Let f be the focal length of the source camera, a property determined from the image metadata
Let x0,y0 be the width and height of the source camera's sensor plane, a property determined from the image metadata
Let X, Y, Z be the georegistration coordinates of the source camera
Select the reference DEM point whose x,y distance from the source camera's X, Y position is minimized
Let z altitude of the reference DEM point
Let d be the distance between the source camera and the reference DEM point $$d=Z-z$$

Let w be the width of the ground coverage area for the image
Let h be the height of the ground coverage area for the image $$w=(d/f)*x0$$

$$h=(d/f)*y0$$

The ground coverage box can now be calculated by factoring the calculating w, h into the source camera's georegistration position.
Let x-min, y-min be the minimum x and y positions of the ground coverage area
Let x-max, y-max be the maximum x and y positions of the ground coverage area $$x\text{-min}=X-(w/2)\ y\text{-min}=Y-(h/2)\ x\text{-max}=X+(w/2)$$
$$y\text{-max}=Y+(h/2)$$

The ground coverage area of the image is described by the coordinates (x-min, y-min), (x-min, y-max), (x-max, y-max), (x-max, y-min).

For instance, referring to the diagram 1500, for an example image of a road running through an observed neighborhood, the source camera capturing the image has a GPS reported altitude of 10 meters (1502) and the selected reference DEM point has an altitude of 3 meters (1504). Using this information, the source camera can be determined to be approximately 7 meters above the ground (1506). With the source camera having an example sensor plane width of 20 millimeters (1508), a sensor plane height of 10 millimeters, and a focal length of 10 millimeters (1510), the source camera can then be determined to have a ground coverage area with a width of 14 meters (1512) and a height of 7 meters.

Determine Overlap in Ground Coverage between Each Pair of Images (Step E)

The overlap in ground coverage between a pair of images describes the quality of the connection between them. An example technique for determining the overlap in ground coverage between image pairs is detailed in the pseudo-code below.

For each pair of images (I-0, I-1) in the set of images S:
Calculate the coordinates of the overlap in ground coverage area by evaluating the relative positions of the coverage area coordinates.
Let A-overlap be the total area of the ground coverage overlap. Save A-overlap for use in the following step For instance, referring to diagram 1600, with two images 1602 and 1604 in an example image set (e.g., image 1602 is a view of a street in Grandview as well as the side-walk and a portion of a building's roof to the west of the street, image 1640 is a view of the same street and the side-walk to the east of the street), the ground coverage area of each image is compared and the intersection 1606 of the ground coverage areas are extracted as the overlap. The total area of this overlap can be determined (e.g., overlap of 15 square meters).

Construct Image Graph Composed of Image Vertices and Overlap Weight Edges (Step F)

An image graph representing the images in the scene and their relationships to each other can be constructed using the determined image overlaps. The image graph can be defined as the undirected graph G(v, e) where v-i is labeled as image-i, and labeled with georegistration-i, for all images in the set the source images and e-ij is defined to connect v-i and v-j where v-i and v-j are in the same graph component and e-ij's weight is determined based on the overlap (e.g., determined as the ratio of overlap area versus total ground coverage, determined as total area of overlap). An example formula for calculating an overlap ratio is as follows:

Let A-overlap be the total area size of the overlap in ground coverage area.
Let A-i be the total area of the image-i ground coverage.
Let A-j be the total area of the image-j ground coverage.

$$E\text{-}ij\text{'s edge weight}=A\text{-overlap}/(A\text{-}i+A\text{-}j)$$

For example, referring to diagram 1700, the ground coverage overlaps 1702 calculated in the previous step E can be used to produce a graph 1704 with weightings determined based on the overlaps. In this example graph 1704, each of the images 1602 and 1604 in the example image set are represented as vertices 1706 and 1708 in one or more graph components and the overlap between pairs of images in the same graph component is represented as an edge 1710 between those image vertices with an edge weight determined, for example, as the overlap ratio.

Prune Graph Components too Small for Reconstruction (Step G)

This step can be similar to step 808, as described above.

Decompose Graph into Disconnected Components by Detecting Graph Clusters (Step H)

This step can be similar to step 810, as described above.

Enforce at Least a Threshold Level of Quality on each of the Graph Components (Step I)

This step can be similar to step 812, as described above.

Identify Adjacent Graph Components (Step J)

This step can be similar to step 814, as described above.

Generate Overlap Graph Components from Pairs of Adjacent Graph Components (Step K)

This step can be similar to step 816, as described above.

Independently Reconstruct 3D Scene Geometry for Each Graph Component (Step L)

This step can be similar to step 818, as described above.

Independently Transform 3D Scene Geometry of Each Graph Component into Real-World Coordinate System using Georegistration Data (Step M)

This step can be similar to step 820, as described above.

Merge Metric 3D Scene Geometry of Disconnected Components into an Approximation of Complete Metric 3D Scene Geometry (Step N)

This step can be similar to step 822, as described above.

Perform Post-Adjustment of Approximate Metric 3D Scene Geometry to Produce Final Scene Geometry (Step O)

This step can be similar to step 824, as described above.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for reconstructing metric 3D scene geometry, the system comprising:
an image source that provides a set of images of a scene;
a distributed computing platform that is programmed to generate a metric 3D scene geometry from the set of images, the distributed computing platform comprising:
a central computing module that is programmed to coordinate generation of the metric 3D scene geometry on the distributed computing platform, the central computing module comprising:
memory;
one or more interfaces to communicate with other computing modules that are part of the distributed computing platform;
a data storage device storing a first set of instructions;
one or more processors that is programmed to execute the first set of instruction using the memory and the one or more interfaces, causing the one or more processors to perform operations comprising:
identifying a plurality of image features from the set of images;
determining matches between the plurality of image features across the set of images;
generating an image graph based on the set of images and the determined matches, wherein image graph comprises (i) vertices that represent images from the set of images and (ii) edges that connect the vertices and that have weights that are determined based on the matches between the plurality of image features;
decomposing the image graph into a plurality of components that each include a portion of the image graph, wherein each of the plurality of components is generated to have at least a threshold level of quality and overlap with others components;
transmitting at least a portion of the plurality of components to the other computing modules in the distributed computing platform;
receiving a plurality of metric 3D scene geometries from the other computing modules in the distribute computing platform, the plurality of metric 3D scene geometries having been determined in parallel across the other computing modules; and
merging the plurality of metric 3D scene geometries to generate a solution providing the metric 3D scene geometry for the entirety of the image set; and
a plurality of distributed computing modules that are each programmed to process one or more of the plurality of components in parallel, each of the plurality of distributed computing modules comprising:
memory;
one or more interfaces to communicate with, at least, the central computing module;
a data storage device storing a second set of instructions;
one or more processors that is programmed to execute the second set of instruction using the memory and the one or more interfaces, causing the one or more processor to perform operations comprising:
receiving one or more of the plurality of components;
determining one or more metric 3D scene geometries for the one or more plurality of components, each of the one or more metric 3D scene geometries being determined individually; and
transmitting the one or more metric 3D scene geometries to the central computing module.

2. The system of claim 1, wherein the solution is an approximate solution, and
wherein the first instruction set further causes the one or more processors of the central computing unit to perform operations comprising:
modifying the approximate solution to be a final solution achieving a comprehensive metric 3D scene geometry for the entirety of the internet-scale image set.

3. The system of claim 2, wherein the modifying comprises performing a bundle block adjustment on the metric 3D scene geometry to generate the final solution, the bundle block adjustment aligning the set of images with scene points in the metric 3D scene geometry.

4. The system of claim 1, wherein the plurality of image features are identified by performing a scale invariant feature transform technique with regard to the set of images.

5. The system of claim 4, wherein the plurality of image features correspond to groupings of visually distinct pixels.

6. The system of claim 1, wherein
identifying the plurality of image features further comprises
generating description vectors for each of the plurality of image features, each of the description vectors including (i) a description of an image feature, (ii) an image from the image set containing the image feature, and (ii) a location identifier identifying location of the image feature in the image; and determining the matches comprises:
comparing the description vectors from the plurality of image features with each other to identify a set of potential feature matches for similar description vectors; and
performing geometric consistency tests on the set of potential feature matches to discard feature matches with location identifiers that do not coincide with each other across different images.

7. The system of claim 1, wherein:
the image graph further comprises edge weights for each of the edges that indicate a degree to which two images connected by an edge include common features,
decomposing the image graph into the plurality of components comprises:
identifying clusters of vertices within the image graph to generate an initial set of components;
removing poor quality components from the initial set of components based on an aggregate of the edge weights within the poor quality components being below a threshold level of quality for the plurality of components;
identifying adjacent components from the initial set of components; and
generating overlap between the adjacent components by adding vertices and edges from one adjacent component to another adjacent component so as to generate overlapping vertices and edges between the adjacent components, the overlapped adjacent components from the initial set of components comprising the plurality of components.

8. The system of claim 1, wherein the operations performed by the one or more processors of the central computing module further comprise:
removing components from the plurality of components that are sufficiently disconnected from others of the plurality of components based on a breadth-first graph traversal technique.

9. The system of claim 1, wherein determining the one or more metric 3D scene geometries comprises:
reconstructing one or more 3D scene geometries individually for each of the one or more of the plurality of components, and
transforming the one or more 3D scene geometries to use a coordinate system based on location information for the set of images, the one or more 3D scene geometries being transformed into the one or more metric 3D scene geometries.

10. The system of claim 9, wherein:
the reconstructing is performed using a structure-from-motion reconstruction technique, and
the coordinate system comprises a global coordinate system that is different from local coordinate systems for each image in the set of images and for each of the plurality of components.

11. The system of claim 1, wherein merging the 3D scene geometries comprises:
generate a merged 3D scene that is initially empty;
for each of the plurality of metric 3D scene geometries:
determining, for each image in the metric 3D scene geometry, whether the camera is already included in the merged 3D scene,
in response to determining that the camera is not present, adding a ground point and a camera into the merged 3D scene for the camera, and
in response to determining that the camera is present, (i) combining a ground point for the camera with redundant ground points in the merged 3D scene and (ii) combining intrinsic and extrinsic properties for the camera with redundant camera information in the merged 3D scene;
removing ground points from the merged 3D scene that have less than a threshold number of corresponding cameras to generate the metric 3D scene geometry.

12. The system of claim 1, wherein the image set is an internet-sized image set.

13. The system of claim 1, wherein the distributed computing platform is a cloud computing system.

14. A method for reconstructing metric 3D scene geometry, the method comprising:
identifying, by a computer system, a plurality of image features from a set of images;
determining, by the computer system, matches between the plurality of image features across the set of images;
generating, by the computer system, an image graph based on the set of images and the determined matches, wherein image graph comprises (i) vertices that represent images from the set of images and (ii) edges that connect the vertices and that have weights that are determined based on the matches between the plurality of image features;
decomposing, by the computer system, the image graph into a plurality of components that each include a portion of the image graph, wherein each of the plurality of components is generated to have at least a threshold level of quality and overlap with others components;
determining, by the computer system, a plurality of metric 3D scene geometries based on individual processing of the plurality of components;
merging, by the computer system, the plurality of metric 3D scene geometries to generate an approximate solution providing metric 3D scene geometry for the entirety of the internet-scale image set; and
modifying, by the computer system, the approximate solution to be a final solution achieving a comprehensive metric 3D scene geometry for the entirety of the internet-scale image set.

15. The method of claim 14, wherein:
the image graph further comprises edge weights for each of the edges that indicate a degree to which two images connected by an edge include common features,
decomposing the image graph into the plurality of components comprises:
identifying clusters of vertices within the image graph to generate an initial set of components;
removing poor quality components from the initial set of components based on an aggregate of the edge weights within the poor quality components being below a threshold level of quality for the plurality of components;
identifying adjacent components from the initial set of components; and
generating overlap between the adjacent components by adding vertices and edges from one adjacent component to another adjacent component so as to generate overlapping vertices and edges between the adjacent components, the overlapped adjacent components from the initial set of components comprising the plurality of components.

16. The method of claim 14, further comprising:
removing components from the plurality of components that are sufficiently disconnected from others of the plurality of components based on a breadth-first graph traversal technique.

17. The method of claim 14, wherein determining the plurality of metric 3D scene geometries comprises:
reconstructing 3D scene geometries individually for each of the plurality of components, and
transforming the 3D scene geometries to use a coordinate system based on location information for the set of images, the 3D scene geometries being transformed into the plurality of metric 3D scene geometries.

18. The method of claim 17, wherein:
the reconstructing is performed using a structure-from-motion reconstruction technique, and
the coordinate system comprises a global coordinate system that is different from local coordinate systems for each image in the set of images and for each of the plurality of components.

19. The method of claim 14, wherein merging the plurality of 3D scene geometries comprises:
generate a merged 3D scene that is initially empty;
for each of the plurality of metric 3D scene geometries:
determining, for each image in the metric 3D scene geometry, whether the camera is already included in the merged 3D scene,
in response to determining that the camera is not present, adding a ground point and a camera into the merged 3D scene for the camera, and
in response to determining that the camera is present, (i) combining a ground point for the camera with redundant ground points in the merged 3D scene and (ii) combining intrinsic and extrinsic properties for the camera with redundant camera information in the merged 3D scene;
removing ground points from the merged 3D scene that have less than a threshold number of corresponding cameras to generate the metric 3D scene geometry.

20. A computer-implemented method for reconstructing metric 3D scene geometry, the method comprising:
identifying, by a computer system, a plurality of geographic regions that are covered by a set of images;
determining, by the computer system, overlapping areas between the plurality of geographic regions;
generating, by the computer system, an image graph based on the set of images and the determined overlapping areas, wherein image graph comprises (i) vertices that represent images from the set of images and (ii) edges that connect the vertices and that have weights that are determined based on the overlapping areas;
decomposing, by the computer system, the image graph into a plurality of components that each include a portion of the image graph, wherein each of the plurality of components is generated to have at least a threshold level of quality and overlap with others components;
determining, by the computer system, a plurality of metric 3D scene geometries based on individual processing of the plurality of components;
merging, by the computer system, the plurality of metric 3D scene geometries to generate an approximate solution providing metric 3D scene geometry for the entirety of the internet-scale image set; and
modifying, by the computer system, the approximate solution to be a final solution achieving a comprehensive metric 3D scene geometry for the entirety of the internet-scale image set.

* * * * *